(12) United States Patent
Jaenisch et al.

(10) Patent No.: US 11,436,537 B2
(45) Date of Patent: Sep. 6, 2022

(54) MACHINE LEARNING TECHNIQUE SELECTION AND IMPROVEMENT

(71) Applicant: Raytheon Company, Waltham, MA (US)

(72) Inventors: Holger M. Jaenisch, Toney, AL (US); James W. Handley, Toney, AL (US); Guy G. Swope, Reston, VA (US)

(73) Assignee: Raytheon Company, Waltham, MA (US)

( * ) Notice: Subject to any disclaimer, the term of this patent is extended or adjusted under 35 U.S.C. 154(b) by 809 days.

(21) Appl. No.: 16/297,202

(22) Filed: Mar. 8, 2019

(65) Prior Publication Data

US 2019/0279112 A1 Sep. 12, 2019

Related U.S. Application Data

(60) Provisional application No. 62/694,882, filed on Jul. 6, 2018, provisional application No. 62/640,958, filed on Mar. 9, 2018.

(51) Int. Cl.
*G06N 20/20* (2019.01)
*G06N 5/04* (2006.01)
*G06K 9/62* (2022.01)

(52) U.S. Cl.
CPC ............. *G06N 20/20* (2019.01); *G06K 9/628* (2013.01); *G06N 5/043* (2013.01)

(58) Field of Classification Search
None
See application file for complete search history.

(56) References Cited

U.S. PATENT DOCUMENTS 6,760,032 B1 7/2004 James
6,941,236 B2 9/2005 Huelsbergen et al.
(Continued)

FOREIGN PATENT DOCUMENTS

EP 2942919 A1 11/2015
WO WO-2019199676 A1 10/2019
(Continued)

OTHER PUBLICATIONS

"U.S. Appl. No. 16/281,888, Non Final Office Action dated May 19, 2020", 15 pgs.
(Continued)

*Primary Examiner* — Alan Chen
(74) *Attorney, Agent, or Firm* — Schwegman Lundberg & Woessner, P.A.

(57) ABSTRACT

A method can include determining a cell of a grid to which a first feature and a second feature of each of a plurality of input/output examples maps, determining an average of respective features of the cell to generate respective level 2 synthetic feature vectors, for each cell with an input/output example of the input/output examples mapped thereto, generating a sub-grid of cells and map the input/output examples mapped to a cell of the sub-grid, determining an average of respective features to generate respective level 1 synthetic feature vectors comprising the average of the respective features, training the ML technique using the level 2 synthetic feature vector, testing the trained ML technique using the level 1 synthetic feature vector of each sub-cell, and further testing the trained ML technique using the input/output examples to generate a class and confidence for each of the input/output examples.

20 Claims, 13 Drawing Sheets

(56) References Cited

U.S. PATENT DOCUMENTS

| | | |
|---|---|---|
| 7,036,016 B1 | 4/2006 | Smith, Jr. |
| 8,301,387 B2 | 10/2012 | Hwa et al. |
| 8,516,596 B2 | 8/2013 | Sandoval et al. |
| 8,839,417 B1 | 9/2014 | Jordan |
| 9,245,116 B2 | 1/2016 | Evans et al. |
| 10,076,273 B2 | 9/2018 | Berckmans et al. |
| 10,110,629 B1 | 10/2018 | Kruse et al. |
| 10,298,598 B1 | 5/2019 | Mcclintock et al. |
| 10,326,796 B1 | 6/2019 | Varadarajan et al. |
| 10,507,973 B2 | 12/2019 | Park |
| 10,521,584 B1 | 12/2019 | Sharifi Mehr |
| 10,929,722 B2 | 2/2021 | Cheng et al. |
| 10,937,465 B2 | 3/2021 | Jaenisch et al. |
| 11,036,858 B2 | 6/2021 | Chistyakov et al. |
| 11,132,923 B2 | 9/2021 | Jaenisch et al. |
| 2003/0084349 A1 | 5/2003 | Friedrichs et al. |
| 2003/0115021 A1 | 6/2003 | Mates |
| 2003/0174895 A1 | 9/2003 | Hsieh |
| 2006/0009956 A1 | 1/2006 | Winckel et al. |
| 2006/0101516 A1 | 5/2006 | Sudaharan et al. |
| 2007/0112585 A1 | 5/2007 | Breiter et al. |
| 2007/0245119 A1 | 10/2007 | Hoppe |
| 2009/0241006 A1 | 9/2009 | Liikanen et al. |
| 2010/0064370 A1 | 3/2010 | Chamley et al. |
| 2011/0238855 A1 | 9/2011 | Korsunsky et al. |
| 2012/0240185 A1 | 9/2012 | Kapoor et al. |
| 2013/0145465 A1 | 6/2013 | Wang et al. |
| 2014/0289852 A1 | 9/2014 | Evans et al. |
| 2015/0026582 A1 | 1/2015 | Basak |
| 2015/0100556 A1 | 4/2015 | Sekiguchi et al. |
| 2015/0131796 A1 | 5/2015 | Milsted |
| 2015/0154796 A1 | 6/2015 | Co |
| 2015/0206315 A1 | 7/2015 | Price et al. |
| 2015/0295907 A1 | 10/2015 | Abrahamson |
| 2016/0321323 A1 | 11/2016 | Gaumnitz et al. |
| 2016/0359685 A1 | 12/2016 | Yadav et al. |
| 2016/0359876 A1 | 12/2016 | Touboul et al. |
| 2016/0359886 A1 | 12/2016 | Yadav et al. |
| 2017/0007148 A1 | 1/2017 | Kaditz et al. |
| 2017/0149787 A1 | 5/2017 | Niemela et al. |
| 2017/0223052 A1 | 8/2017 | Stutz |
| 2017/0257396 A1 | 9/2017 | Shen et al. |
| 2017/0302691 A1 | 10/2017 | Singh et al. |
| 2017/0310690 A1 | 10/2017 | Mestha et al. |
| 2017/0310705 A1 | 10/2017 | Gopalakrishna et al. |
| 2017/0327890 A1 | 11/2017 | Saint-andre et al. |
| 2018/0027004 A1 | 1/2018 | Huang et al. |
| 2018/0085011 A1 | 3/2018 | Ma et al. |
| 2018/0137277 A1 | 5/2018 | Mestha et al. |
| 2018/0160905 A1 | 6/2018 | Wang et al. |
| 2018/0204111 A1 | 7/2018 | Zadeh et al. |
| 2018/0336436 A1 | 11/2018 | Cheng et al. |
| 2018/0337935 A1 | 11/2018 | Marwah et al. |
| 2018/0374109 A1* | 12/2018 | Scarpati .................. G06N 7/00 |
| 2019/0018375 A1 | 1/2019 | Deshpande et al. |
| 2019/0149565 A1 | 5/2019 | Hagi et al. |
| 2019/0180181 A1 | 6/2019 | Lilley |
| 2019/0196746 A1 | 6/2019 | Fujimoto et al. |
| 2019/0289034 A1 | 9/2019 | Erez et al. |
| 2019/0296913 A1 | 9/2019 | Verma et al. |
| 2019/0311120 A1 | 10/2019 | Jaenisch et al. |
| 2019/0312908 A1 | 10/2019 | Jaenisch et al. |
| 2019/0383874 A1 | 12/2019 | Jaenisch et al. |
| 2020/0202251 A1 | 6/2020 | Jaenisch et al. |
| 2020/0204574 A1 | 6/2020 | Christian |
| 2020/0272731 A1 | 8/2020 | Jaenisch et al. |
| 2020/0273499 A1 | 8/2020 | Jaenisch et al. |
| 2020/0326695 A1 | 10/2020 | Jaenisch et al. |
| 2020/0362334 A1 | 11/2020 | Regev et al. |
| 2021/0027171 A1 | 1/2021 | Jaenisch et al. |
| 2021/0060858 A1 | 3/2021 | Rakshit |

FOREIGN PATENT DOCUMENTS

| | | |
|---|---|---|
| WO | WO-2019199769 A1 | 10/2019 |
| WO | WO-2019199777 A1 | 10/2019 |
| WO | WO-2020172122 A1 | 8/2020 |
| WO | WO-2020172124 A1 | 8/2020 |
| WO | WO-2021016533 A1 | 1/2021 |

OTHER PUBLICATIONS

"International Application Serial No. PCT/US2020/018570, International Search Report dated Apr. 28, 2020", 4 pgs.

"International Application Serial No. PCT/US2020/018570, Written Opinion dated Apr. 28, 2020", 7 pgs.

"International Application Serial No. PCT/US2020/018574, International Search Report dated Apr. 28, 2020", 4 pgs.

"International Application Serial No. PCT/US2020/0185/4, Written Opinion dated Apr. 28, 2020", 7 pgs.

U.S. Appl. No. 16/265,526, filed Feb. 1, 2019, Device Behavior Anomaly Detection.

U.S. Appl. No. 16/379,154, filed Apr. 9, 2019, Cyber Chaff Using Spatial Voting.

U.S. Appl. No. 16/379,162, filed Apr. 9, 2019, Encryption Using Spatial Voting.

U.S. Appl. No. 16/381,179, filed Apr. 11, 2019, Behavior Monitoring Using Convolutional Data Modeling.

U.S. Appl. No. 16/522,235, filed Jul. 25, 2019, Gene Expression Programming.

U.S. Appl. No. 16/554,206, filed Aug. 28, 2019, Alternative Techniques for Design of Experiments.

U.S. Appl. No. 16/281,888, filed Feb. 21, 2019, Anomaly Detection With Reduced Memory Overhead.

U.S. Appl. No. 16/281,922, filed Feb. 21, 2019, Anomaly Detection With Adaptive Auto Grouping.

"U.S. Appl. No. 16/281,888, Corrected Notice of Allowability dated Jan. 27, 2021", 2 pgs.

"U.S. Appl. No. 16/281,888, Examiner Interview Summary dated Aug. 10, 2020", 3 pgs.

"U.S. Appl. No. 16/281,888, Notice of Allowance dated Oct. 20, 2020", 12 pgs.

"U.S. Appl. No. 16/281,888, Response filed Aug. 18, 2020 to Non Final Office Action dated May 19, 2020", 10 pgs.

"U.S. Appl. No. 16/379,154, Examiner Interview Summary dated Jan. 8, 2021", 2 pgs.

"U.S. Appl. No. 16/379,154, Non Final Office Action dated Oct. 15, 2020", 25 pgs.

"U.S. Appl. No. 16/379,154, Response filed Jan. 14, 2021 to Non Final Office Action dated Oct. 15, 2020", 10 pgs.

"U.S. Appl. No. 16/379,162, Non Final Office Action dated Nov. 10, 2020", 20 pgs.

"International Application Serial No. PCT/US2019/026338, International Preliminary Report on Patentability dated Oct. 22, 2020", 9 pgs.

"International Application Serial No. PCT/US2019/026514, International Preliminary Report on Patentability dated Oct. 22, 2020", 7 pgs.

"International Application Serial No. PCT/US2019/026522, International Preliminary Report on Patentability dated Oct. 22, 2020", 7 pgs.

"International Application Serial No. PCT/US2020/043434, International Search Report dated Oct. 16, 2020", 4 pgs.

"International Application Serial No. PCT/US2020/043434, Written Opinion dated Oct. 16, 2020", 5 pgs.

Deng, Song, et al., "Distributed intrusion detection based on hybrid gene expression programming and cloud computing in a cyber physical power system", IET Control Theory and Applications, The Institution of Engineering and Technology, GB, vol. 11, No. 11, (Jul. 14, 2017), 1822-1829.

Elsayed, Saber, et al., "Evaluating the performance of a differential evolution algorithm in anomaly detection", IEEE Congress on Evolutionary Computation (CEC), IEEE, (May 25, 2015), 2490-2497.

(56) References Cited

OTHER PUBLICATIONS

Holnglei, Gao, et al., "A GEP-Based Anomaly Detection Scheme in Wireless Sensor Networks", Computational Science and Engineering, CSE '09. International Conference on, IEEE, Piscataway, NJ, USA, (Aug. 29, 2009), 817-822.
"International Application Serial No. PCT/US2019/026338, International Search Report dated Jun. 21, 2019", 5 pgs.
"International Application Serial No. PCT/US2019/026338, Written Opinion dated Jun. 21, 2019", 7 pgs.
"International Application Serial No. PCT/US2019/026514, International Search Report dated Jul. 5, 2019", 5 pgs.
"International Application Serial No. PCT/US2019/026514, Written Opinion dated Jul. 5, 2019", 8 pgs.
"International Application Serial No. PCT/US2019/026522, International Search Report dated Jul. 8, 2019", 4 pgs.
"International Application Serial No. PCT/US2019/026522, Written Opinion dated Jul. 8, 2019", 5 pgs.
Farlow, Stanley, "The GMDH Algorithm of Ivakhnenko", The American Statistician, vol. 35, No. 4, (1981), 210-215.
Ferreira, Candida, "Gene Expression Programming in Problem Solving", Soft Computing and Industry, (2002), 635-653.
Ferreira, Candida, "Gene Expression Programming: A New Adaptive Algorithm for Solving Problems", Complex Systems, vol. 13, issue 2, (2001), 22 pgs.
Gabor, D, et al., "A Universal Non-linear filter, predictor and simulator which optimizes", The Institution of Electrical Engineers, Paper No. 3270 M, (1960), 422-435.
Ivakhnenko, A G, "Heuristic Self-Organization in Problems of Engineering Cybernetics", Automatica, vol. 6, (1969), 207-219.
Ivakhnenko, A G, et al., "The Review of Problems Solvable by Algorithms of the Group Method of Data Handling (GMDH)", Pattern Recognition and Image Analysis, vol. 5, No. 4, (1995), 527-535.
Jaenisch, H, et al., "Generalized information fusion and visualization using spatial voting and data modeling", Society of Photo-Optical Instrumentation Engineers SPIE Proceedings vol. 8756 No. 875609, (May 2013), 16 pgs.
Jaenisch, Holger, et al., "A novel application of data modeling for extracting mathematical ontologies and relationship matrix features from text documents", SPIE Defense + Commercial Sensing, (2005), 12 pgs.
Jaenisch, Holger, et al., "A robust regularization algorithm for polynomial networks for machine learning", Proc. SPIE 8059, Evolutionary and Bio-Inspired Computation: Theory and Applications V, 80590A, (May 2011), 21 pgs.
Jaenisch, Holger, et al., "Autonomous Journaling Response Using Data Model LUTS", Proc. of SPIE vol. 7344, (2009), 11 pgs.
Jaenisch, Holger, "Converting data into functions for continuous wavelet analysis", Proceedings of SPIE—The International Society for Optical Engineering, (pp. 2-13), (2009), 13 pgs.
Jaenisch, Holger, "Data Modeling Applications in Space Science and Astronomy", PhD thesis, James Cook University (pp. 1-130 of 255 pages total), (2009), 130 pgs.
Jaenisch, Holger, "Data Modeling Applications in Space Science and Astronomy", PhD thesis, James Cook University (pp. 131-256 of 255 pages total), (2009), 126 pgs.
Jaenisch, Holger, et al., "Data Modeling for Change Detection of Inventory Flow and Instrument Calibration", Proceedings of SOLE, (2003), 10 pgs.
Jaenisch, Holger, et al., "Data Modeling for Fault Detection", MFPT, (2003), 10 pgs.
Jaenisch, Holger, et al., "Data Modeling for network dynamics", Proceedings of SPIE—The International Society for Optical Engineering, (2004), 12 pgs.
Jaenisch, Holger, et al., "Data Modeling for Predictive Behavior Hypothesis Formation and Testing", Proc. SPIE 6241, Data Mining, Intrusion Detection, Information Assurance, and Data Networks Security, (2006), 12 pgs.
Jaenisch, Holger, et al., "Data-modeling-enabled guidance, navigation, and control to enhance the lethality of interceptors against maneuvering targets", Proceedings of SPIE—The International Society for Optical Engineering Mar. 2005, 13 pgs.
Jaenisch, Holger, et al., "Digital MicroArray Analysis for Digital Artifact Genomics", Cyber Sensing, (2013), 20 pgs.
Jaenisch, Holger, "Entropyology: Microarray Analysis Analogy for Digital Artifact Discrimination", Proceedings of SPIE, vol. 8359, (2012), 20 pgs.
Jaenisch, Holger, "Geospatial Feature Based Automatic Target Recognition (ATR) using data models", Proceedings vol. 7697, Signal Processing, Sensor Fusion, and Target Recognition XIX, (2010), 12 pgs.
Jaenisch, Holger, et al., "Insider Threat Detection Enabled by Converting User Applications into Fractal Fingerprints and Autonomously Detecting Anomalies", SPIE Proceedings vol. 8408, (2012), 22 pgs.
Jaenisch, Holger, et al., "Performance Comparison of the Prophecy (Forecasting) Algorithm in FFT Form for Unseen Feature and Time-Series Prediction", Proc. SPIE 8757, Cyber Sensing, (2013), 30 pgs.
Jaenisch, Holger, et al., "Shai-Hulud The quest for worm sign", Proc. SPIE 5812, Data Mining, Intrusion Detection, Information Assurance, and Data Networks Security, (2005), 9 pgs.
Jaenisch, Holger, et al., "Spatial Voting for Automatic Feature Selection, Fusion and Visualization", Proc. SPIE 8756, Multisensor, Multisource Information Fusion: Architectures, Algorithms, and Applications, (2013), 21 pgs.
Jaenisch, Holger, "Spatial Voting with Data Modeling", Sensor Fusions and its Applications, (2010), 153-178.
Jaenisch, Holger, et al., "Virtual Instrument Prototyping with Data Modeling", (2003), 15 pgs.
Kamalika, Bhattacharjee, et al., "A Survey of Cellular Automata: Types, Dynamics, Non-uniformity and Applications", Arxiv.org, Cornell University Library, 201 Olin Library Cornell University Ithaca, NY, (Jul. 8, 2016).
Oltean, Mihai, et al., "An autonomous GP-based system for regression and classi?cation problems", Applied Soft Computing 9, (2009), 49-60.
"U.S. Appl. No. 16/265,526, Non Final Office Action dated Jul. 12, 2021", 16 pgs.
"U.S. Appl. No. 16/281,922, Non Final Office Action dated Sep. 2, 2021", 9 pgs.
"U.S. Appl. No. 16/379,154, Advisory Action dated Aug. 30, 2021", 6 pgs.
"U.S. Appl. No. 16/379,154, Final Office Action dated Apr. 29, 2021", 32 pgs.
"U.S. Appl. No. 16/379,154, Response filed Jul. 29, 2021 to Final Office Action dated Apr. 29, 2021", 11 pgs.
"U.S. Appl. No. 16/379,162, Examiner Interview Summary dated Feb. 12, 2021", 2 pgs.
"U.S. Appl. No. 16/379,162, Notice of Allowance dated May 26, 2021", 11 pgs.
"U.S. Appl. No. 16/379,162, Response filed Feb. 10, 2021 to Non Final Office Action dated Nov. 10, 2020", 8 pgs.
"U.S. Appl. No. 16/379,162, Supplemental Notice of Allowability dated Aug. 18, 2021", 3 pgs.
"U.S. Appl. No. 16/381,179, Non Final Office Action dated Jun. 25, 2021", 10 pgs.
"U.S. Appl. No. 16/522,235, Non Final Office Action dated Aug. 16, 2021", 11 pgs.
"International Application Serial No. PCT/US2020/018570, International Preliminary Report on Patentability dated Sep. 2, 2021", 9 pgs.
"International Application Serial No. PCT/US2020/018574, International Preliminary Report on Patentability dated Sep. 2, 2021", 9 pgs.
"U.S. Appl. No. 16/265,526, Corrected Notice of Allowability dated Jan. 5, 2022", 2 pgs.
"U.S. Appl. No. 16/265,526, Examiner Interview Summary dated Sep. 23, 2021", 2 pgs.
"U.S. Appl. No. 16/265,526, Notice of Allowance dated Dec. 27, 2021", 10 pgs.
"U.S. Appl. No. 16/265,526, Response filed Oct. 11, 2021 to Non Final Office Action dated Jul. 12, 2021", 9 pgs.

(56) References Cited

OTHER PUBLICATIONS

"U.S. Appl. No. 16/281,922, Examiner Interview Summary dated Nov. 29, 2021", 2 pgs.
"U.S. Appl. No. 16/281,922, Notice of Allowance dated Jan. 20, 2022", 8 pgs.
"U.S. Appl. No. 16/281,922, Response filed Dec. 2, 2021 to Non Final Office Action dated Sep. 2, 2021", 11 pgs.
"U.S. Appl. No. 16/379,154, Amendment & Response Under 37 C.F.R. § 1.116 filed Sep. 29, 2021", 11 pgs.
"U.S. Appl. No. 16/379,154, Notice of Allowance dated Mar. 2, 2022", 13 pgs.
"U.S. Appl. No. 16/381,179, Examiner Interview Summary dated Sep. 30, 2021", 2 pgs.
"U.S. Appl. No. 16/381,179, Notice of Allowance dated Jan. 21, 2022", 7 pgs.
"U.S. Appl. No. 16/381,179, Response filed Sep. 27, 2021 to Non Final Office Action dated Jun. 25, 2021", 10 pgs.
"U.S. Appl. No. 16/522,235, Advisory Action dated Feb. 24, 2022", 4 pgs.
"U.S. Appl. No. 16/522,235, Examiner Interview Summary dated Nov. 10, 2021", 2 pgs.
"U.S. Appl. No. 16/522,235, Final Office Action dated Nov. 30, 2021", 15 pgs.
"U.S. Appl. No. 16/522,235, Non Final Office Action dated Mar. 31, 2022", 10 pgs.
"U.S. Appl. No. 16/522,235, Response filed Jan. 25, 2022 to Final Office Action dated Nov. 30, 2021", 9 pgs.
"U.S. Appl. No. 16/522,235, Response filed Nov. 16, 2021 to Non Final Office Action dated Aug. 16, 2021", 9 pgs.
"International Application Serial No. PCT/US2020/043434, International Preliminary Report on Patentability dated Feb. 3, 2022", 7 pgs.

* cited by examiner

MACHINE LEARNING TECHNIQUE SELECTION AND IMPROVEMENT

RELATED APPLICATION

This application claims the benefit of priority to U.S. Provisional Patent Application Ser. No. 62/640,958, filed on Mar. 9, 2018, and titled "ANALYTICAL HIERARCHICAL PROCESSING FOR MACHINE LEARNING METHOD SELECTION" and U.S. Provisional Patent Application Ser. No. 62/694,882, filed on Jul. 6, 2018, and titled "MACHINE LEARNING ALGORITHM ADAPTATION", which are incorporated by reference herein in their entirety.

TECHNICAL FIELD

Embodiments described herein generally relate to data processing and artificial intelligence and, more particularly, to self-optimization of machine-learning algorithms.

BACKGROUND

Developers of artificial intelligence (AI) systems are constantly working to identify improvements in the performance (e.g., accuracy) of supervised machine learning (ML) techniques. For example, one of the most common approaches involves combining machine learning algorithms in a technique called ensemble learning. Many challenges remain, including determining the best way to construct an ensemble of methods, and the computational burden of training many algorithms instead of one.

Numerous approaches have been tried, such as Bayes Optimal Classifier, boosting, bagging, and stacking. These tend to have a number of limitations—specifically the two challenges listed above (how to construct, time to implement/train).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 4 illustrates, by way of example, a diagram of an embodiment of another portion of a process for characterizing an innate ability for an ML technique to classify accurately.

FIG. 5 illustrates, by way of example, a diagram of an embodiment of another portion of a process for characterizing an innate ability for an ML technique to classify accurately.

DETAILED DESCRIPTION

Aspects of the embodiments are directed to systems and methods for determining and adapting an ML technique from among numerous techniques based on the nature of the type of data to be processed. Embodiments can leverage information theoretic methods (ITM) to reduce an amount of training data, increase an accuracy of the ML technique, and prioritizing accuracy of classification into a specified class over accuracy of classification into another class.

Some embodiments characterize and optimize across machine learning methods. In some examples, information from a plurality (e.g., 15+) leading machine learning algorithms is autonomously considered to increase the accuracy of individual machine learning methods. Aspects of the embodiments can achieve improvements in computational performance by using synthetic data.

According to some embodiments, each machine learning algorithm is utilized as an orthogonal sensor observing a common entity and giving its best state estimate and estimation error, and each orthogonal sensor is associated with a corresponding bias. Notably, different machine learning algorithms have different biases to different data sets and features within those data sets.

Some embodiments can use a three-layer process to understand each ML bias and use that to fuse ML techniques together. For example, in layer one, an ML-fusion system trains and scores multiple ML techniques using one or more variants of the input data. In layer two, the ML-fusion system can use one or more of the training accuracy and truth data from layer one and uses those as input data into the same multiple ML techniques to learn each ML technique's bias. In layer three, the ML-fusion system can use the output from layer 2 and optionally send it into an analytical hierarchical processor (AHP) to bias features for another round of training of each of the multiple ML techniques. This technique has shown the ability to make existing ML techniques more accurate in classification.

Examples of ML techniques that may be used with the ML-fusion, trained synthetic data, or other embodiments can include (without limitation) Single Decision Tree, Random Forest, Boosted Tree, SVM (Support Vector Machines), CNN (Convolutional Neural Network), ANN/MLP (Artificial Neural Network/Multilayer Perceptron), Directed BBN (Bayesian Belief Network), RBF (Radial Basis Function), Polynomial Networks, Naïve Bayes, Regression, GEP (Gene Expression Programming), K-Means Clustering, GMM (Generalized Mixture Model), and Information Theoretic Methods (ITM).

Figure 1:
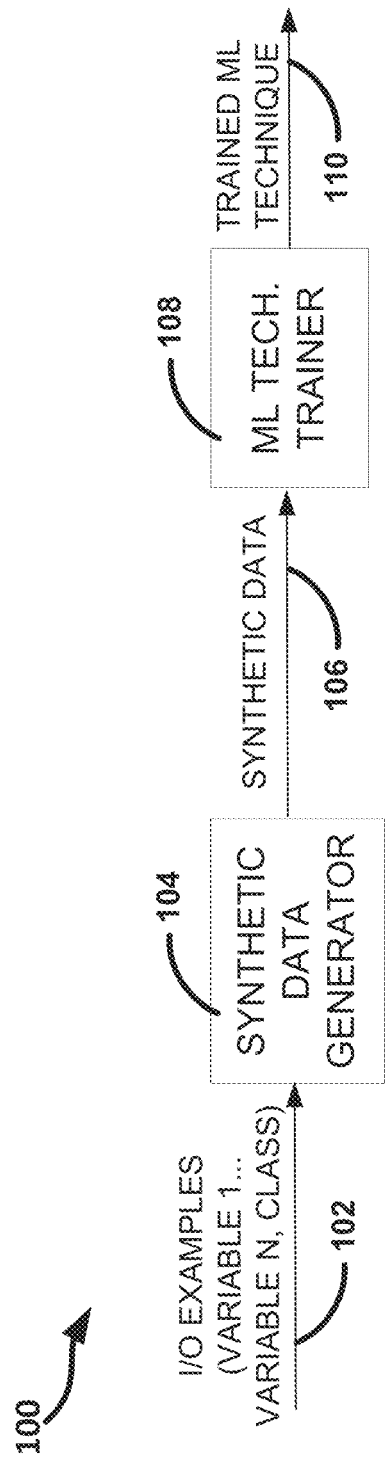
FIG. 1 illustrates, by way of example, a diagram of an embodiment of a system for synthetic data generation and ML training.

FIG. 1 illustrates, by way of example, a diagram of an embodiment of a system 100 for synthetic data generation and ML training. The system 100 as illustrated includes a synthetic data generator 104 and an ML technique trainer 108. The synthetic data generator 104 performs a Spatial Voting (SV) operation on I/O examples 102 and generates synthetic data 106 based on the I/O examples 102.

The I/O example 102 (sometimes called input/output examples) include input data and can optionally include a class to which the input data is a member. The input data can include variables that can be output from one or more processes or devices. The processes or devices can be any of a wide range of sensors, firewalls, network traffic monitors, bus sniffers, or the like. The processes or devices can provide variable data in a wide variety of formats, such as alphanumeric, character, strictly numeric, list of characters or numbers, strictly alphabet, or the like. Any non-numeric input can be converted to a numeric value as part of the SV operation (see FIGS. 8-11 for further details).

Figure 2:
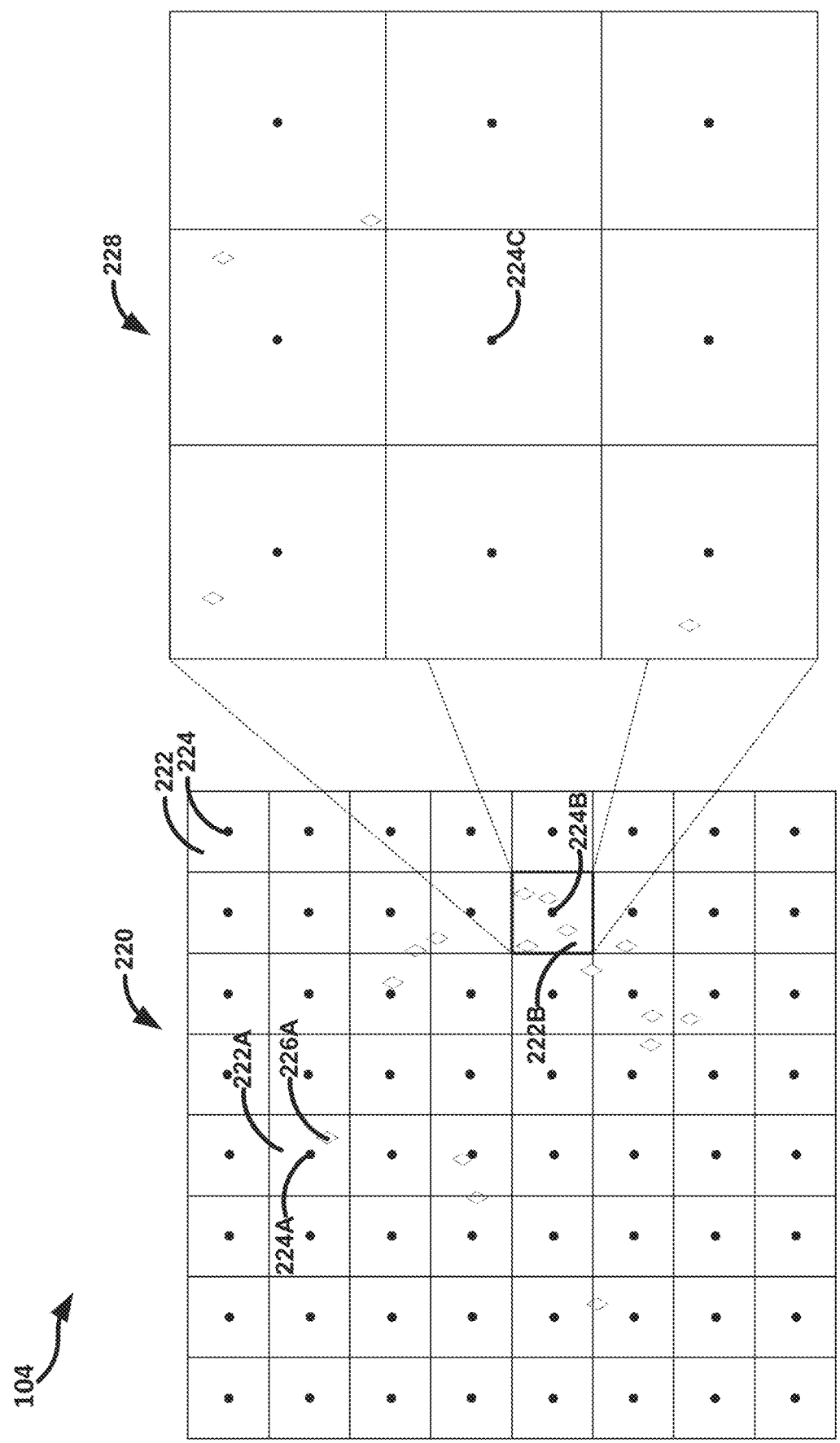
FIG. 2 illustrates, by way of example, a portion of a synthetic data generation process, such as can be performed by the SV data generator.

FIG. 2 illustrates, by way of example, a portion of a synthetic data generation process, such as can be performed by the SV data generator 104. The SV operation converts N-numeric values (feature vectors) to values of two features (same feature on different data or different features on same data) and maps the two features to an SV grid 220. The SV grid 220 includes cells 222 (of equal size and extent) each with a corresponding cell center 224. The cell center 224 can serve as a convenient reference point for the cell 222.

The diamonds 226 represent respective locations to which an I/O example 102 is mapped based on a determined feature. For more information regarding the types of features and other details of SV operations, please refer to FIGS. 8-11.

The synthetic data generator 104 performs the SV operations and generates the synthetic data 106. The synthetic data 104 can include, for each cell, an average of all features of data mapped thereto. For a cell that includes only a single I/O example 102 mapped thereto, the average is trivial and is just the value of the features (e.g., variables) of the I/O example represented by the diamond 226. For example, the cell 222A has only a single I/O example 102 mapped thereto, so the synthetic data 106 for the cell 222A is the value of the variables of that I/O example 102. The synthetic data 106 can then be associated with the center 224A of the cell.

The cell 222B includes multiple I/O examples mapped thereto. In such a case, the individual variables are averaged per variable, to determine a single value for each variable to be associated with the center of the cell 222B. Assume the I/O examples that map to the cell 222B have the following values (along with an optional class):

| I/O Example | variable 1 | variable 2 | variable 3 | variable 4 | variable 5 | variable 6 |
|---|---|---|---|---|---|---|
| 1 | value 1 | value 5 | value 9 | value 13 | value 17 | value 21 |
| 7 | value 2 | value 6 | value 10 | value 14 | value 18 | value 22 |
| 11 | value 3 | value 7 | value 11 | value 15 | value 19 | value 23 |
| 16 | value 4 | value 8 | value 12 | value 16 | value 20 | value 24 |

Note that six variables per I/O example 102 is merely an example, and more or fewer variables (e.g., features of a feature vector) can be used. The synthetic data value associated with the center 224B can be the average of each value of the variable so the value of the synthetic data 106 for the cell 222B in this example can be:

Synthetic Data=(Avg(value 1,value 2,value 3,value 4),Avg(value 5,value 6,value 7,value 8),Avg (value 9,value 10,value 11,value 12),Avg(value 13,value 14,value 15,value 16),Avg(value 17,value 18,value 19,value 20),Avg(value 21,value 22,value 23,value 24))

Avg can include the mean, expectation, median, mode, fusion of values, ensembling, lossy compression, or other average.

Like I/O examples 102 can be voted to a same or nearby cell. This is, at least in part because the SV operation has the ability to vote similar I/O examples to same or nearby cells. The synthetic data 106 generated at this point can be used as training data for an ML technique, such as by the ML technique trainer 108 to generate a trained ML classifier 110.

However, in some embodiments, the class of the I/O examples 102 can be important or the synthetic data 106 can be used in a specific process that requires more data analysis. In such embodiments, the mapped data (represented by the diamonds 226) can be further processed.

Consider again, the cell 222B and the four mapped data points. Also, assume that the respective classes associated with two or more of the four mapped data points are different. The cell 222B can be further divided further into a sub-grid 228. The number of cells in a row and column of the sub-grid 228 can be rounded up to the nearest odd integer, and determined by the following equation:

$$\text{maximum}(3, \text{sqrt}(\text{number of points mapped to cell}))$$

The centers 224B and 224C can correspond to the same point, while the remaining centers of the sub-grid 228 correspond to different points. The variables of I/O examples 102 mapped to a same cell 222 can be averaged (in the same manner as discussed previously) to generate the synthetic data 106 for that cell.

In the example of FIG. 2, all the cells of the grid 228 include only a single point mapped thereto, thus there is no class conflict and the process can end. However, further sub-dividing of the grid can be required in some examples to remove class conflicts.

The synthetic data 106 from the grid 220 is sometimes called L2 synthetic data and the synthetic data 106 from the grid 228 is sometimes called L1 synthetic data. In examples in which data mapped to a cell in the grid 228 includes disparate classes, the cell can be further subdivided until the data in each cell no longer includes a conflicting class designation. In such examples, the synthetic data from the final subdivided grid is considered L1 synthetic data and the synthetic data from the immediately prior grid is considered L2 synthetic data. The L1 and L2 synthetic data labels are used to aid in understanding the ML improvement techniques described regarding FIGS. 3-5.

Figure 3:
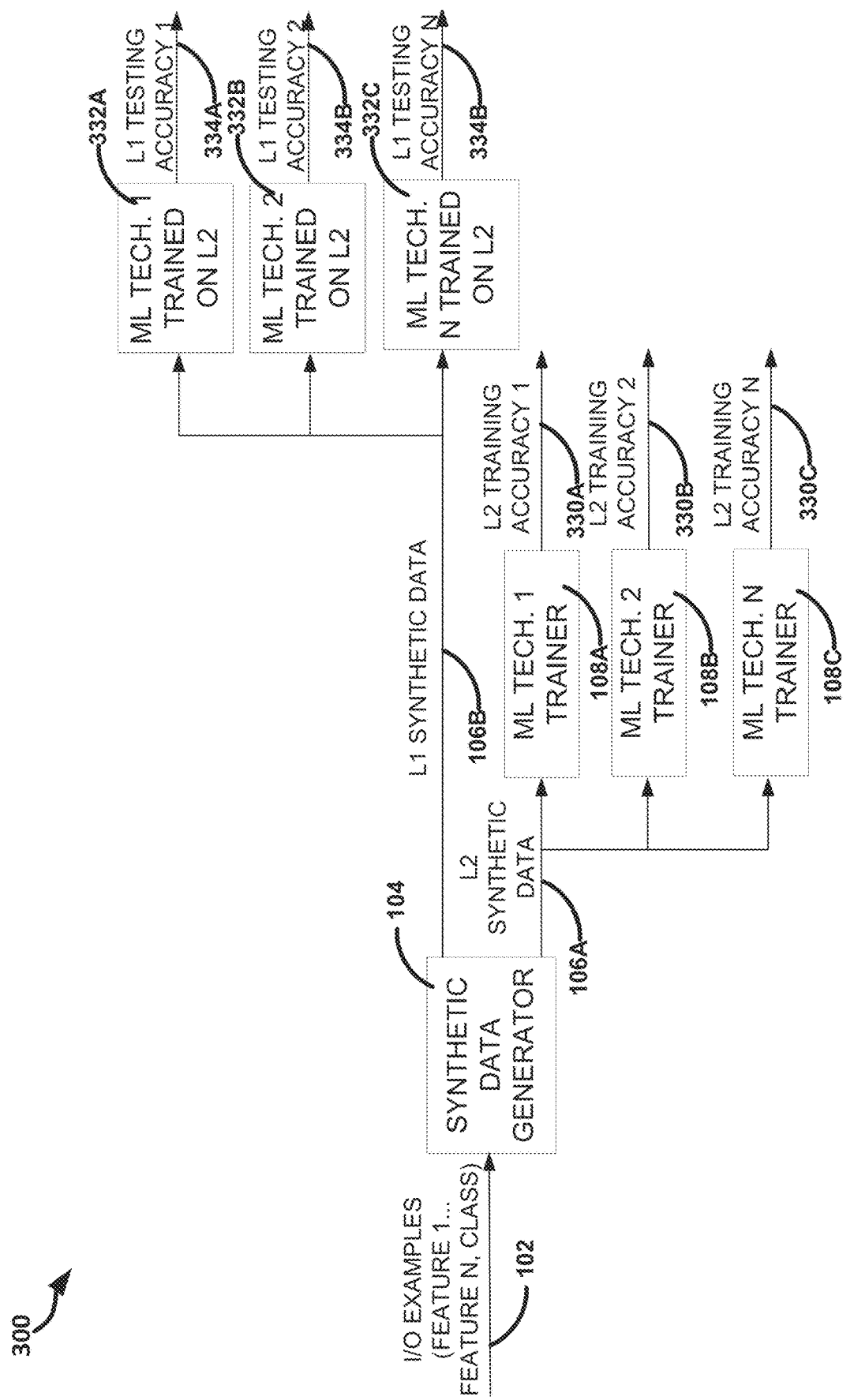
FIG. 3 illustrates, by way of example, a diagram of an embodiment of a portion of a system for characterizing an innate ability of an ML technique to classify accurately.

FIG. 3 illustrates, by way of example, a diagram of an embodiment of a portion of a system 300 for characterizing an innate ability of an ML technique to classify accurately.

The system 300 includes the synthetic data generator 104, a plurality of ML technique trainers 108A, 108B, and 108C and a plurality of trained ML techniques 334A, 334B, 334C. The synthetic data generator 104 receives the I/O examples 102 and generates L1 synthetic data 106B and L2 synthetic data 106A. The L1 synthetic data 106B can be generated based on the grid 228, while the L2 synthetic data 106A can be generated based on the grid 220. As previously discussed, the L1 synthetic data 106A can alternatively be from a further sub-grid, such as in examples in which a cell of the grid 228 includes data mapped thereto with conflicting (non-equal) classes and the L2 synthetic data 106B can be from the immediately preceding sub-grid that includes at least one cell with data mapped thereto with conflicting classes.

The L2 synthetic data 106A can be used to train each of a plurality of ML techniques, such as by the ML technique trainers 108A-108C. Each of the ML techniques can be different versions of a same technique, different techniques, a combination thereof, or the like. The ML technique trainer 108A-108C can determine a training accuracy 330A, 330B, 330C for each of the trained techniques. The training accuracy 330 indicates how well the ML technique classified the L2 synthetic data 106A. The training accuracy 330 is an indication of the ability to explain the L2 data 106A.

In general, ML technique training includes learning parameters (sometimes called weights) that reduce a specified cost function based on training data. The training data includes a feature vector and a class. The ML technique trainer 108A-108C adjusts the parameters so that the trained ML technique 332A-332C identifies a correct class for the input data (L2 synthetic data 106A in the example of FIG. 3). By adjusting the parameters of the ML technique, different input feature vectors can be mapped to corresponding classes. The goal can be to generate 100% classification accuracy in testing, but this may not be achievable in all instances.

The L1 synthetic data 106B can be used to test each of the trained ML techniques 332A, 332B, 332C that were trained on the L2 synthetic data 106A. A testing accuracy 334A, 334B, 334C can be determined for each of the trained ML techniques 332A-332C. The testing accuracy is an indication of the ability of the trained ML techniques 332A-332C to generalize what they learned by being trained on the L2 synthetic data 106A to variations on the L2 synthetic data 106A that are present in the L1 synthetic data 106B.

The L1 synthetic data 106B and L2 synthetic data 106A can be a vector of the form (avg (variable 1), avg (variable 2) . . . , avg (variable N), class), where N is any positive integer greater than 1. The L1 synthetic data 106B and the L2 synthetic data 106A can optionally include a value corresponding to a center of an associated cell, or the avg can be determined further based on the value of the center of the cell. The value of the center of the cell is (feature 1, feature 2). L1 synthetic data 106B can be a bigger data set than the L2 synthetic data 106A, as some of the points that were averaged to generate the L2 synthetic data may be mapped to different cells (e.g., sub-cells) in the L1 synthetic data 106B.

FIG. 4 illustrates, by way of example, a diagram of an embodiment of another portion of a process 400 for characterizing an innate ability for an ML technique to classify accurately. The process 400 can be performed after the process 300. The process 400 includes using the trained ML techniques 332A-332C on the I/O examples 102. Recall that the ML technique was trained based on the L2 synthetic data 106A and then tested based on the L1 synthetic data 106B. Neither of the L2 synthetic data 106A nor the L1 synthetic data is necessarily the same as the I/O examples 102. Using the trained ML technique 332A-332C to classify the I/O examples 102 can provide further insight into the ability for the trained ML technique 332A-332C to generalize to other input beyond the L1 synthetic data 106A and the L2 synthetic data 106B.

A class 440A, 440B, 440C and corresponding confidence 442A, 442B, 442C of using the trained ML technique 332A-332C on the I/O examples 102 can be recorded. This data indicates how well the trained ML technique 332A-332C performs (e.g., per class). Consider an example of an image recognition technique that strives to classify an image of a single numerical into one of ten classes (e.g., class 0, class 1, . . . class 9). In this example, the ML technique 332A can classify the I/O examples of some of the classes very accurately and not classify the I/O examples of some of the other classes with sufficient accuracy (e.g., accuracy above a specified threshold, such as fifty percent, seventy-five percent, eighty percent, ninety percent, ninety-five percent, ninety-eight percent, ninety-nine percent, one hundred percent, a lesser or greater percentage, or some percentage therebetween). In this same example, the ML technique 332B, 332C may be more accurate than the ML technique 332A in classifying I/O examples 102 of the classes for which the ML technique 332A is not sufficiently accurate.

At this point, a user may choose to use multiple trained ML techniques 332A-332C to classify their I/O examples 102. The choice can be for ML techniques 332A-332C that, in combination, classify the data (with sufficient accuracy) into all classes. A different user may not have sufficient resources to implement multiple trained ML techniques 332A-332C, filter based on classification, and produce a result. For these users, the ML techniques can be re-trained (using the ML tech trainer 108A-108C), from scratch, using knowledge gained from this process. The ML techniques can thus learn the classes for which they, and other ML techniques, are sufficiently accurate or insufficiently accurate. The ML techniques can thus have their parameters adjusted in a second training pass to try to make the technique classify more accurately in all classes.

Also, at this point, a user may filter ML techniques 332A-332C from further processing. For example, consider that a user needs the ML technique to classify into class 3 and class 4 very accurately and that the trained ML technique 332C classifies into class 3 with little accuracy. The user can remove the ML technique 332C from further processing. A technique for determining which techniques are best at satisfying goals of a user is provided regarding FIG. 6.

FIG. 5 illustrates, by way of example, a diagram of an embodiment of another portion of a process 500 for characterizing an innate ability for an ML technique to classify accurately. The process 500 can be performed after the process 400 or the process 600 (see FIG. 6). In the process 500 an ML technique trainer 560 (e.g., the ML technique trainer 108A-108C), trains the ML technique based on the class 440 and the confidence 442 and other data from a previous training and testing pass. The data from the previous training and testing pass can include the testing accuracy 334 of the ML techniques (with or without ML techniques that were removed by filtering), the L2 training accuracy 330 of the ML techniques, a number representing the L2 training accuracy 330 divided by the testing accuracy 334 (L2 TA/L1 TA 552) for each ML technique, or a combination thereof. This training pass is sometimes called a subsequent training pass. The result of this training pass is one or more trained ML techniques that can classify with improved accuracy as compared to the trained ML technique 332 on the L2 synthetic data 106A.

The ML technique trainer 560 can produce a class 562 and corresponding confidence 564 for each of the ML techniques. This class 562 and confidence 564 can be used to identify the trained ML technique or techniques that the user can deploy for their classification needs.

Figure 6:
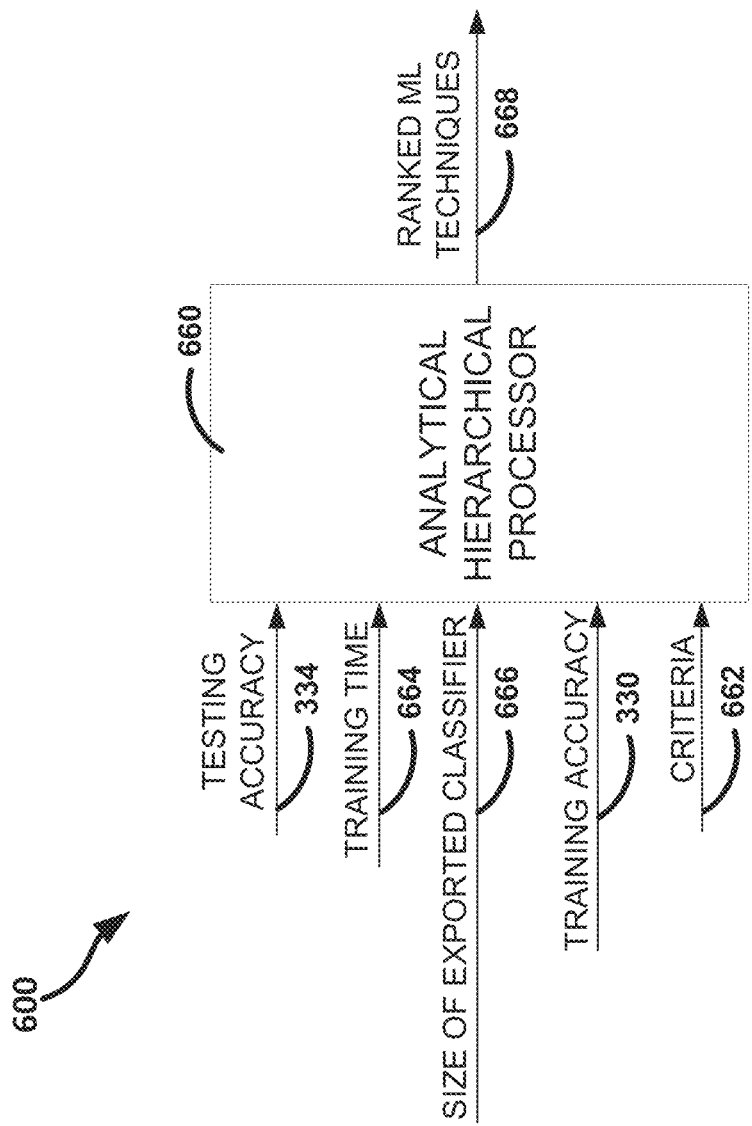
FIG. 6 illustrates, by way of example, a diagram of an embodiment of a portion of a process for ranking the trained ML techniques.

FIG. 6 illustrates, by way of example, a diagram of an embodiment of a portion of a process 600 for ranking the trained ML techniques 332A-332C. The process 600 can include using an analytical hierarchical processor (AHP) 660 to generate a ranked list of the ML techniques 668. The AHP 660 can determine the ranked ML techniques 668 based on the testing accuracy 334, the training accuracy 330, the value corresponding to the training accuracy divided by the testing accuracy, a training time 664 indicating an amount of time consumed in training the ML technique using the ML technique trainer 108A-108C, a size of the ML technique 666 (an amount of memory (random access memory (RAM), read only memory (ROM), or a combination thereof) consumed by the trained ML technique 332A-332C after deployment, or other criteria 662 such as computational resource requirements, length (size) or complexity of exported classifiers, use case criteria requiring use of a specific subset of ML techniques such as exclusively using DCNNs (Deep Convolutional Neural Networks) where a plurality of such have been created by hyperparameterization for Layer 1 to be used exclusively in the fusion process, limiting to methods that use only if-then logic structures such as Decision Trees, Random Forest, Boosted Trees, etc. (e.g., for specific external use case explanation), limiting Layer 1 methods to Bayesian, Kernel Based, or Clustering Based methods (e.g., to derive Layer 2 fusions that adhere to specific mathematical criteria for behavior convergence or boundedness, etc.). In general, the criteria can include any criteria external to the use case and its representative I/O examples, as long as measurable numeric characteristics of such criteria exist to guide which methods from Layer 1 to bring forward to Layer 2 in ranked form. In general, this includes replacing any conventional node in a multi or deep learning layered neural network architecture with an entire ML method or independent or orthogonal computational process or decision architecture that may be completely independent of the I/O examples and originally envisioned use case.

Further, synthetic data enables transfer of knowledge between ML methods using abstraction of the minimum description covering data sets in lieu of complete or partially trained weights being used as a reference or starting point by the downstream ML or online method.

Figure 7:
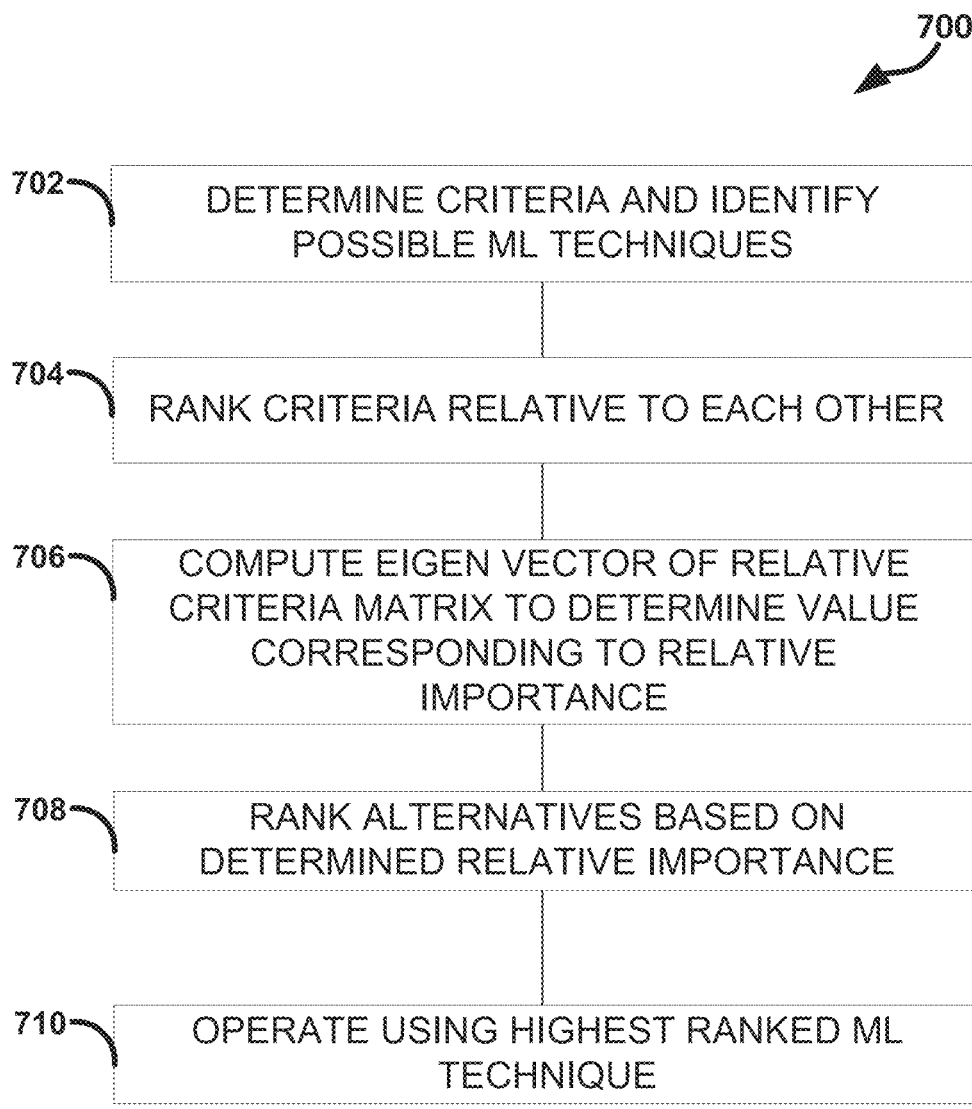
FIG. 7 illustrates, by way of example, a diagram of an embodiment of a method for ranking trained ML techniques.

FIG. 7 illustrates, by way of example, a diagram of an embodiment of a method 700 for ranking trained ML techniques 332. The method 700 can be performed by the AHP 660. The method 700 as illustrated includes determining an objective and criteria and identify possible ML techniques to satisfy the objective, at operation 702; ranking the criteria relative to each other, at operation 704; computing an Eigen vector of a relative criteria matrix to determine a value corresponding to the relative importance for each criteria, at operation 706; arranging the ML techniques based on the determined relative importance, at operation 708; and operating using the highest ranked ML technique, at operation 710.

An objective of the process 700 can be to identify the best ML technique to use to classify an input. The criteria determined at operation 702 can include the testing accuracy 334, the training accuracy 330, the value corresponding to the training accuracy divided by the testing accuracy, the training time 664 indicating an amount of time consumed in training the ML technique using the ML technique trainer 108A-108C, the amount of memory consumed by the trained ML technique 332A-332C after deployment, or other criteria 662. The user of the process 700 can indicate, at operation 704, a relative importance of the criteria determined at operation 702. For example, a specific example can include a user attempting to implement a classifier on an embedded device with limited processor or memory resources available to perform the ML technique. In such an example, the size of exported classifier 666 can be important. In another example, a user can have limited time to identify an ML technique for use. In such an example, the training time 664 can be important. To indicate this, the user can rank the criteria relative to other criteria. To indicate that one criterion is more important, the user can associate a larger relative value with that criteria and a lower relative value with other criteria. To indicate that criterion is of same importance, the user can associate a same value with each of the criterion at operation 704. To indicate that criterion is of lower importance, the user can associate a lower relative value with the criterion than another criterion.

The operation 704 can include generating a matrix to quantify the relative importance of the criteria. The matrix can be setup as follows:

| 1 | 1/a | 1/b | 1/c |
|---|-----|-----|-----|
| a | 1   | 1/d | 1/e |
| b | d   | 1   | 1/f |
| c | e   | f   | 1   | where a is the importance of criteria 2 relative to criteria 1, b is the importance of criteria 3 relative to criteria 1, c is the importance of criteria 4 relative to criteria 1, d is the importance of criteria 3 relative to criteria 2, e is the importance of criteria 4 relative to criteria 2, and f is the importance of criteria 4 relative to criteria 3. The diagonal is all "1" as it reflects an importance of criteria relative to itself. The values of the Eigen vector can provide weights to apply to the values of the criteria for each ML technique 332A-332C.

The operation 708 can include determining a weighted sum of the criteria for each trained ML technique 332A-332C. The weighting can include using a value (e.g., normalized value) of the Eigen vector associated with the criteria. The operation 708 can include assembling the trained ML techniques 332A-332C in order of the determined value (ascending or descending order). Only the top ranked, trained ML techniques 332A-332C can be used in further processing in some embodiments.

A trained ML technique 332A-332C deployed on a device can be considered a sensor. The device can receive input and operate on the input using the trained ML technique 332A-332C to detect whether the input falls within a specified class. The device thus senses whether input associated with the class is present. The AHP 660 can provide data indicating a state estimate for the sensor.

Figure 8:
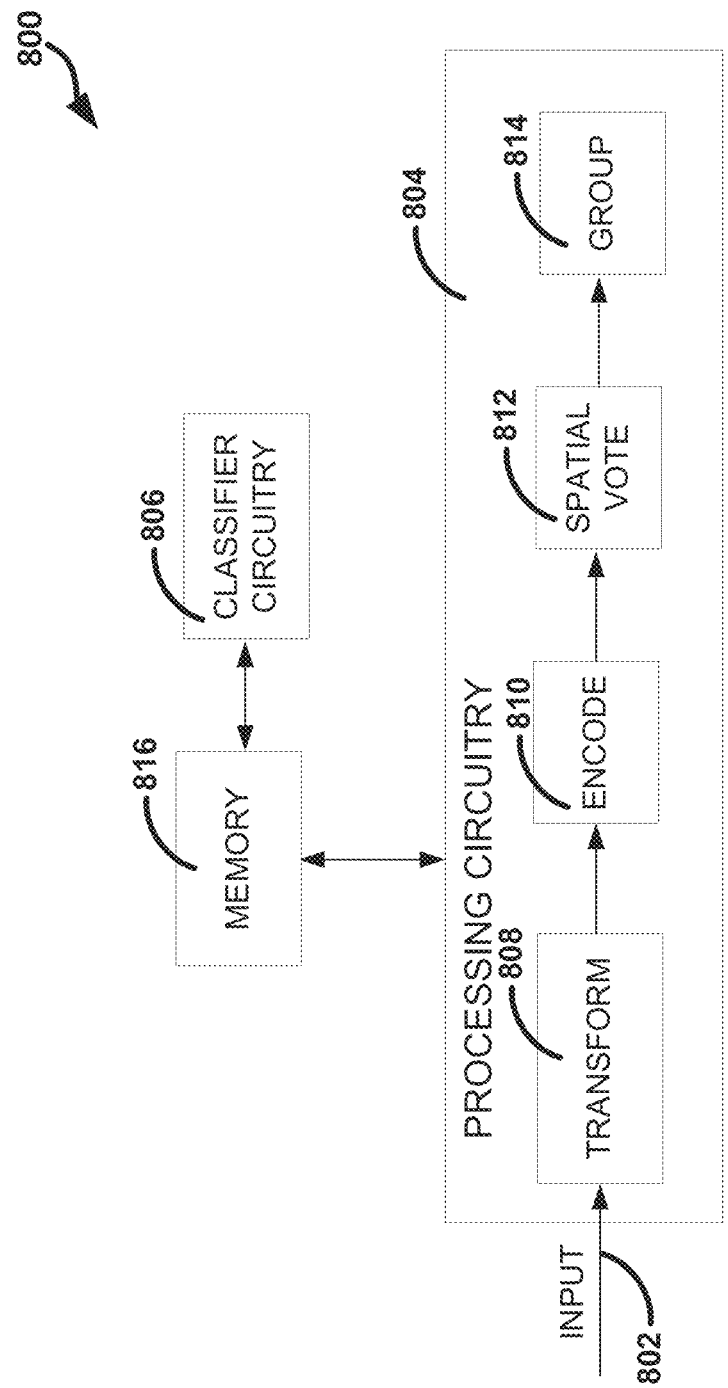
FIG. 8 illustrates, by way of example, a diagram of an embodiment of a system for anomaly detection.

FIG. 8 illustrates, by way of example, a diagram of an embodiment of a system 800 for anomaly detection. The system 800 as illustrated includes processing circuitry 804, classifier circuitry 806, and a memory 816. The processing circuitry 804 can identify an anomaly (a behavior that has not been seen by the processing circuitry 804 up to the point the behavior is seen). The classifier circuitry 806 can present the anomaly to a user for action, adjust SV grid parameters, or the like. The memory 816 can store key values, SV grid parameters, or other data input or output from the processing circuitry 804.

The processing circuitry 804 receives input 802. The input 802 can include binary data, text, signal values, image values, or other data that can be transformed to a number. The processing circuitry 804 can transform the input 802 to a number, at operation 808. The operation 808 can include encoding the input into a specified format, parsing the data into chunks (e.g., chunks of a specified size), or the like. For example, the operation 808 can include encoding text input to an American Standard Code for Information Interchange (ASCII) encoding to transform the input 802 into numbers between zero (0) and two hundred fifty-five (255). In another example, the operation 808 can include converting chunks of binary data to their numerical equivalent, such as two's complement, unsigned integer, floating number (e.g., short or long), or the like. In yet another example, the operation 808 can include performing an analog to digital conversion on analog signal data, such as by an analog to digital converter. In yet another example, the operation 808 can include combining red, green, blue (RGB) values of a color image, or the like, to generate a number. Not all input 802 needs to be transformed, thus the operation 808 is optional.

The processing circuitry 804 can receive numbers either as raw input 802 or from the operation 808 and encode the numbers into two features (discussed below) at operation 810. The operation 810 is order-sensitive, such that the same inputs received in a different order encode (likely encode) to different features.

Examples of features include RM, RS, SM, SS, TM, TS, OC1, OC2, and OCR (discussed below). These calculations are performed in the sequence shown so that they can be calculated in a single pass across the data element where a value derived by an earlier step is used in an antecedent step directly and all calculations are updated within a single loop. RM can be determined using Equation 1:

$$RM_i = (RM_{i-1} + X_i)/2 \qquad \text{Equation 1}$$

In Equation 1, $X_i$ is the ith input value for i=1, 2 ... n.

RS can be determined using Equation 2:

$$RS_i = \left(RS_{i-1} + \sqrt{\frac{(X_i - RM_i)^2}{2}}\right)/2 \qquad \text{Equation 2}$$

SM can be determined using Equation 3:

$$SM_i = \Sigma X_i/n \qquad \text{Equation 3}$$

SS can be determined using Equation 4:

$$SS_i = \sqrt{(SS_{i-1} + (X_i - SM_i)^2)/(n-1)} \qquad \text{Equation 4}$$

TM can be determined using Equation 5:

$$TM_i = (TM_{i-1} + SM_{i-1})/2 \qquad \text{Equation 5}$$

TS can be determined using Equation 6:

$$TS_i = \left(TS_{i-1} + \sqrt{\frac{(X_i - TM_i)^2}{2}}\right)/2 \qquad \text{Equation 6}$$

Orthogonal component 1 (OC1) can be determined using Equation 7:

$$OC1_i = (RM_i + SM_i + TM_i)/3 \qquad \text{Equation 7}$$

Orthogonal component 2 (OC2) can be determined using Equation 8:

$$OC2_i = (RS_i + SS_i + TS_i)/3 \qquad \text{Equation 8}$$

Orthogonal component rollup (OCR) can be determined using Equation 9:

$$OCR_i = OC1_i + OC2_i \qquad \text{Equation 9}$$

There is no "best" encoding for all use cases (Ugly Duckling Theorem limitation). Each set of encoding features used as (x, y) pairs will yield a different but valid view of the same data, with each sensitive to a different aspect of the same data. "R" features tend to group and pull together, "S" features tend to spread out, "T" features tend to congeal data into fewer groups, but sub groups tend to manifest with much more organized structure, and "OC" features tend to produce the most general spread of data. "OC" features most resemble PC1 and PC2 of traditional Principal Component Analysis (PCA) without the linear algebra for eigenvectors.

Each feature is now described in more detail with suggested application:

R-type feature—Associates data into closer, less spread groups, guaranteed to be bounded in SV data space if the encoding is bounded and the SV space is similarly bounded (e.g., if ASCII encoding is used and the x and y extent are bounded from [000]-[255]). R-type features are recommended when the dynamic variability in data is unknown (typically initial analysis). This can be refined in subsequent analysis. R-type features will tend to group data more than other features.

S-type feature—Tends to spread the data out more. How the encoded data spreads can be important, so things that stay together after spreading are more likely to really be similar. S-type features produce a potentially unbounded space. S-type features tend to spread data along one spatial grid axis more than another. Note, if the occupied cells in the SV spatial grid fall along a 45-degree line, then the 2 chosen state types are highly correlated and are describing the same aspects of the data. When this occurs, it is generally suggested that one of the compressive encoding features be changed to a different one.

T-type feature—These compressive encoding features are sensitive to all changes and are used to calculate running mean and running sigma exceedances. T-type features can provide improved group spreading over other features types. T-type features tend to spread data along both axes.

OC-type feature—Orthogonal Components, which are simple fast approximations to PCA (Principal Component Analysis). The OC1 component is the average of RM, SM, and TM, OC2 is the average of RS, SS, and TS, and OCR is the sum of OC1 and OC2.

Note that while two variants of each type of feature are provided (e.g., RS and RM are each a variant of an R-type feature) cross-variants can provide a useful analysis of data items. For example, if an RS or RM is used as feature 1, any of the S-type features, T-type features, or OC-type features can also be used as feature 2. Further, two of the same features can be used on different data. For example, TS on a subset of columns of data from a row in a comma separated values (CSV) data file can form a feature 1, while TS on the same row of data but using a different subset of columns can form a feature 2.

In some embodiments, one or more features can be determined based on length of a corresponding data item. The length-based features are sometimes called LRM, LRS, LSM, LSS, etc.

The features of Equations 1-9 are order-dependent. The features can be plotted against each other on a grid of cells, at operation 812. The processing circuitry 804 can initialize an SV grid to which the encoded inputs are mapped, such as at operation 812.

Plotted values can be associated or correlated, such as at operation 814. The operation 814 can include forming groups of mapped inputs and determining an extent thereof. More details regarding the operations 808-814 are provided in FIGS. 2-4.

The classifier circuitry 806 can provide a user with a report indicating behavior that is anomalous. An input mapped to a cell that was not previously populated is considered anomalous. If an input is mapped to a cell that already has an input mapped thereto by the features, the input can be considered recognized or known. Since some applications can be memory limited, an entity can opt to have few cells in an SV grid. For these cases, it can be beneficial to determine an extent that an encoded value is situated away from a center of a cell. If the encoded value is a specified distance away from the center or a center point (e.g., as defined by a standard deviation, variance, confidence ellipse, or the like), the corresponding data item can be considered anomalous. Such embodiments allow for anomaly detection in more memory-limited devices.

The classifier circuitry 806, in some embodiments, can indicate in the report that an input known to be malicious was received. The report can include the input, the group (if applicable) to which the cell is a member, a number of consecutive inputs, a last non-anomalous data item, a subsequent non-anomalous data-item, such as for behavioral analysis or training, or the like. The classifier circuitry 806 can indicate, in the report, different types of anomalies. For example, a type 1 anomaly can indicate a new behavior that falls within an area of regard (AOR). A type 2 anomaly can indicate a new behavior that falls outside of an area of regard. An area of regard can be determined based on one or more prior anomaly detection epochs. In a given epoch, there can be one or more areas of regard. An anomaly detection epoch is a user-defined interval of analyzing a number of inputs, a time range, or the like. The epoch can be defined in the memory 816 and monitored by the processing circuitry 804.

In some embodiments, an event for the report can include a single anomalous behavior. In some embodiments, an event for the report can be reported in response to a specified threshold number of type 2 anomalies.

The classifier circuitry 806 can adjust SV grid parameters. An initial size of an SV grid cell can be determined. In some embodiments, the initial size of the SV grid cell can include dividing the space between (0, 0) and the encoded (x, y) of the first input data item into an N×N SV grid, where N is the initial number of cells on a side of the SV grid (for example, a 16×16 SV grid would break up the distance in x and in y to the first data point from the origin into 16 equal divisions).

As new input data items are introduced and encoded, whenever one fall outside the extent of the SV grid, the N×N SV grid can be increased in size to (N+1)×(N+1) until either the new input data item is included on the resized SV grid, or N becomes equal to the maximum allowed number of SV grid cells on a side of the SV grid. After N becomes a defined maximum SV grid size (for example 64×64), and a new input data item falls off of the current SV grid, the size of each SV grid cell size can be increased so that the SV grid encompasses the new data point.

As either the number of SV grid cells on a side or the overall extent of the SV grid in x and y are increased to encompass new input data items, the SV grid column (Equation 14), SV grid row (Equation 15), and key index value (Equation 16) can be changed to map the populated SV grid cells from the previous SV grid to the newly size one. To accomplish this, the center (x, y) value of each populated SV grid cell can be calculated using the minimum and maximum x and y values and the number of SV grid cells in the previous SV grid, and then mapping the centers and their associated SV grid counts onto the new SV grid using Equations 14, 15, and 16. This is done using the following equations:

$$Row = \text{int}(Key\ Value/(\text{number of cells on side})) \quad \text{Equation 10}$$

$$Col = Key\ Value - \text{int}(Row*(\text{number of cells on side})) \quad \text{Equation 11}$$

$$Center\ 1 = x\min + Col*(x\text{range})/(num.\ col - 1) \quad \text{Equation 12}$$

$$Center\ 2 = y\min + Row*(y\text{range})/(num.\ row - 1) \quad \text{Equation 13}$$

The values for Center 1 and Center 2 can then be used in Equations 14, 15, and 16 (below) as Feature 1 and Feature 2 to calculate the new Key Value for each populated cell on the new SV grid.

Figure 9:
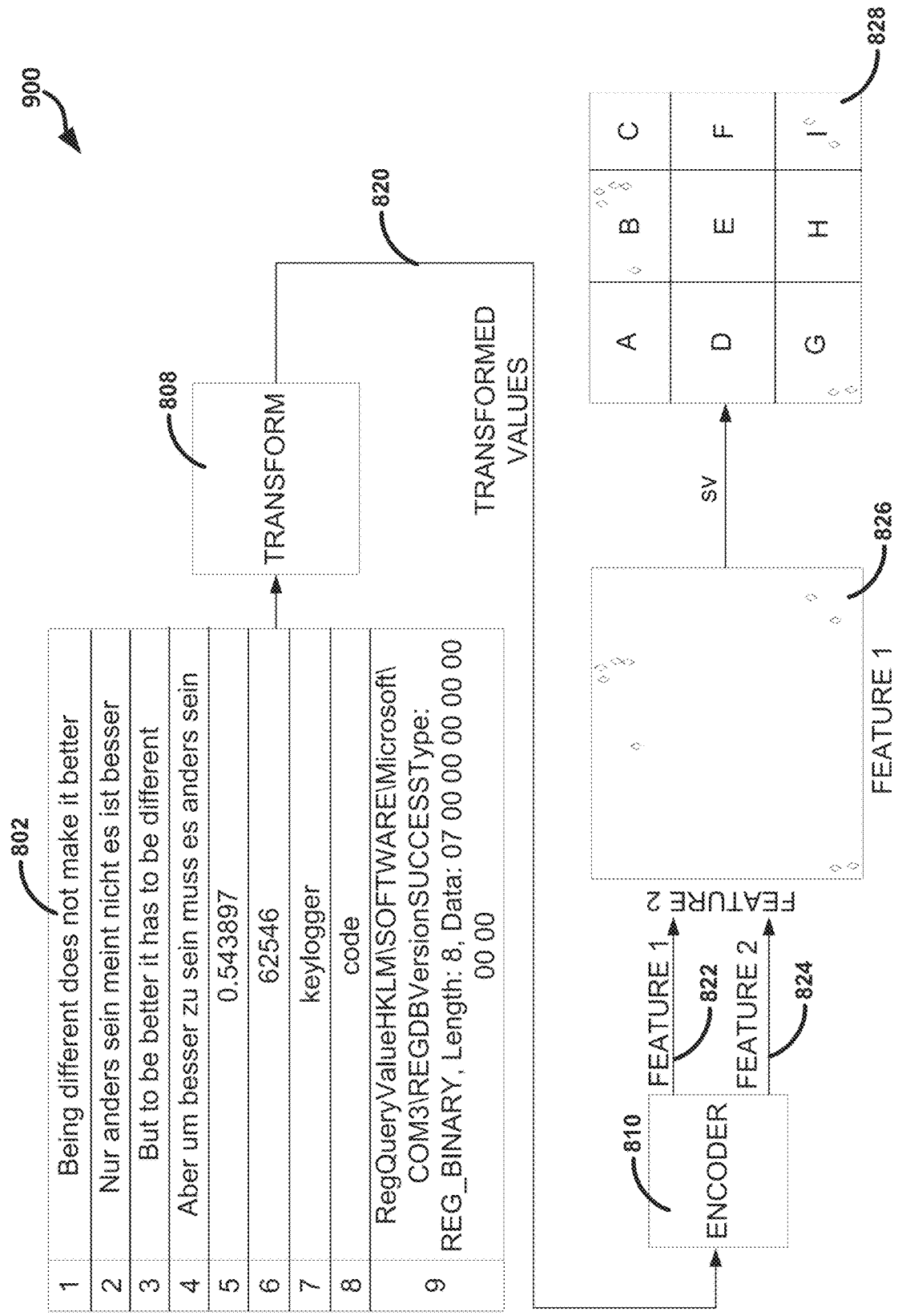
FIG. 9 illustrates, by way of example, a diagram of an embodiment of a method for identifying an anomalous behavior.

FIG. 9 illustrates, by way of example, a diagram of an embodiment of a method 900 for identifying an anomalous behavior. The method 900 as illustrated includes receiving the input 802. The input 802 in FIG. 9 includes nine text strings labelled "1"-"9". Each of the text strings "1"-"9" of the input 102 is respectively transformed to transformed values 820 at operation 808. An example transformation is ASCII encoding which transforms text to numerical values. The transformed values 820 can be used to perform the operation 810. The operation 810 can include determining two features 822, 824 of the input 802 and plotting them against each other to form a feature graph 826. The features 822, 824 can include, for example, RM, RS, SM, SS, TM, and TS, in some embodiments.

Consider the input data item "1". Each character of the input data item "1" can be transformed to an ASCII value. The features can be determined based on the ASCII encoding of the entire string. That is, $X_i$, is the ASCII value of each character and the features are determined over all ASCII encodings of the characters of the input data item "1". As an example, the resultant RM can be feature 1 822 and the resultant RS can be feature 2 824, or vice versa. This is merely an example and any order-dependent feature can be chosen for feature 1 and any order-dependent feature chosen for feature 2. Each of the input data items "1"-"9" can be processed in this manner at operation 808 and 810.

The graph 826 can then be split into cells to form a grid 828. The cells of FIG. 9 are labelled "A"-"I" for illustration (Key Values are numeric labels of the SV grid cells from Equation 16). Inputs 802 mapped to a same cell can be considered similar. Inputs 802 mapped to an empty cell can be considered anomalous. In the grid 828, input data items "1"-"4" (sentences in English and German) are mapped to cell "B", input data items 5-6 (numbers) are mapped to cell "I", and input data items "7-8" (words) are mapped to cell "G". Input data item 9, which is a combination of words, numbers, and other characters, maps to cell "B" indicating that input data item "9" is more like a sentence than a word or number. If a subsequent input data item 802 were to be received and mapped to cell "A", "C", "D", "E", "F", or "H" it can be deemed anomalous, as it is a behavior that has not been received before and is sufficiently different from other behaviors that have been seen previously.

As can be seen, whether an input is considered an anomaly is dependent on a size of a cell. The size of the cell can be chosen or configured according to an operational constraint, such as a size of a memory, compute bandwidth, or the like. The size of a cell can be chosen or configured according to a desired level of security. For example, a higher level of security can include more cells, but require more memory and compute bandwidth to operate, while a lower level of security can include fewer cells but require less memory and bandwidth to operate.

Figure 10:
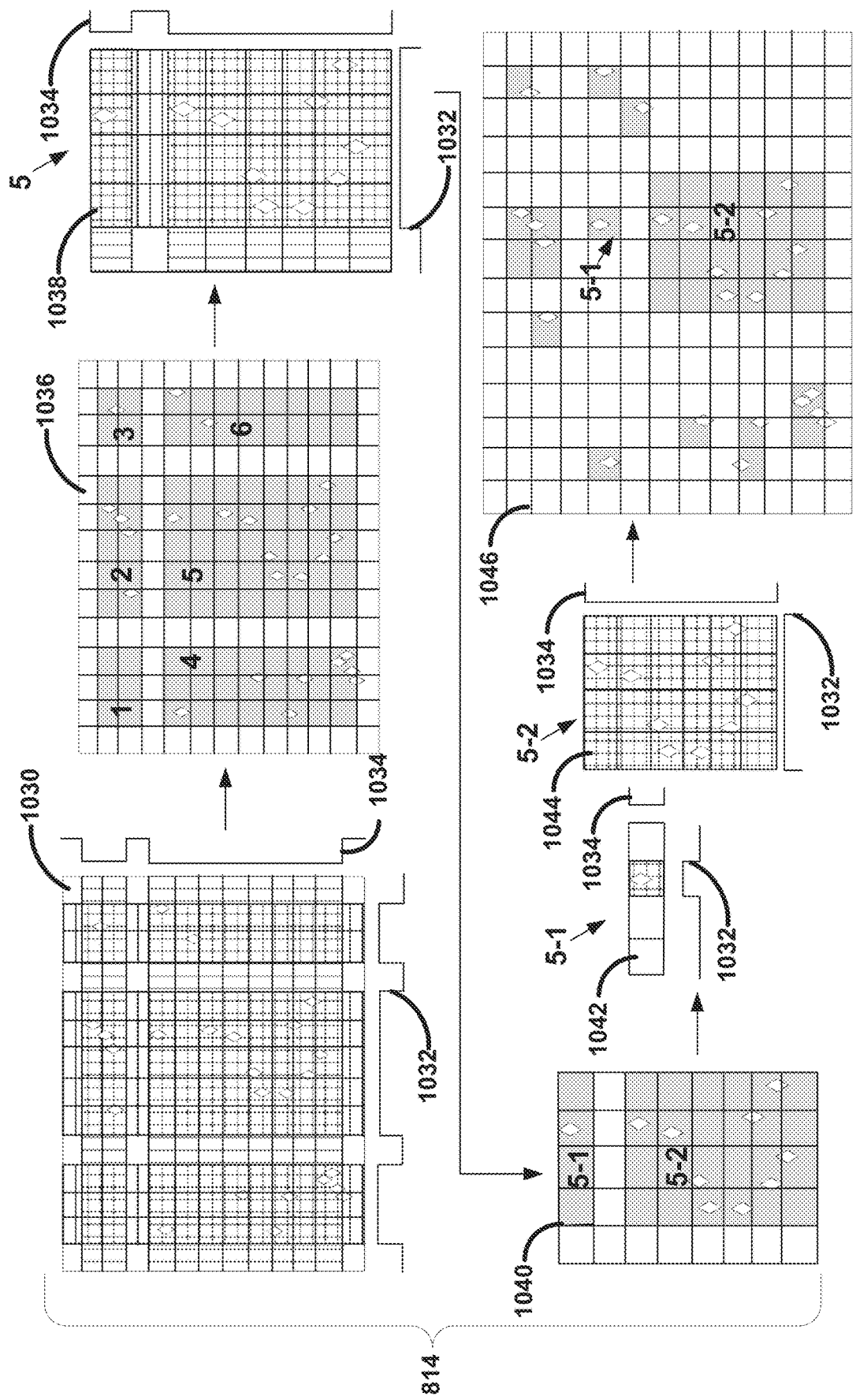
FIG. 10 illustrates, by way of example, a diagram of an embodiment of the operation.

FIG. 10 illustrates, by way of example, a diagram of an embodiment of the operation 814. Encoded inputs ((x, y) points) are represented by diamonds. The operation 814 (sometimes called shadowing for group extraction) can include an iterative process that identifies cells that are populated and aggregates and separates those cells into groups. The iterative process can include:

1) Identifying cells of columns with at least one populated cell at operation 1032 (indicated by horizontal hashing in graph 1030)
2) Identifying cells of rows with at least one populated cell at operation 1034 (indicated by vertical hashing in graph 1030)
3) For each cell identified at both (1) and (2) (indicated by cross-hashing in the cell), (a) aggregate with all contiguous cells identified at both (1) and (2), (b) assign aggregated cells to a group, and (c) label the group with a key
4) Repeat (1)-(3) for each group/sub-group until no change.

A graph 1036 illustrates the result of a first iteration of performing the operations (1)-(3). After the first iteration, six groups "1"-"6" in FIG. 10 are formed. Next each of the groups "1"-"6" are processed by operations (1)-(3). In FIG. 10, the second iteration is illustrated for group "5". The operations 1032 and 1034 can be performed on a sub-grid 1038 formed by the cells of group "5". A graph 1040 illustrates the result of the second iteration of performing the operations (1)-(3). After a second iteration on group "5", two sub-groups "5-1" and "5-2" are formed in the example of FIG. 10.

In the example of FIG. 10, a third iteration of the operations (1)-(3) is performed on the subgroups "5-1" and "5-2". The operations 1032 and 1034 can be performed on sub-grids 1042, 1044 formed by the cells of sub-groups "5-1" and "5-2". A graph 1046 illustrates the result of the performing all iterations of the operations (1)-(3) and the groups formed therefrom.

In some embodiments, the number of cells can be adaptive, such as to be adjusted during runtime as previously discussed. Related to this adaptive cell size is determining the location of an encoded input in the grid and a corresponding key value associated with the encoded input. An example of determining the location in the grid includes using the following equations (for an embodiment in which feature 1 is plotted on the x-axis and feature 2 is plotted on the y-axis):

$$Col=\text{int}((\text{feature 1}-x\text{min})*(\text{num. col}-1)/(x\text{range})) \quad \text{Equation 14}$$

$$Row=\text{int}((\text{feature 2}-y\text{min})*(\text{num. row}-1)/(y\text{range})) \quad \text{Equation 15}$$

An encoding on the grid, sometimes called key value, can be determined using Equation 16:

$$\text{Key Value}=\textit{num. row}*Row+Col \quad \text{Equation 16}$$

The "x min", "y min", "x max", and "y max" can be stored in the memory 816. Other values that can be stored in the memory 816 and relating to the grid of cells include "max grid size", "min grid size", or the like. These values can be used by the processing circuitry 804 to determine "x range", "num. col.", "y range", or "num. row", such as to assemble the grid of cells or determine a key value for a given encoded input (e.g., (feature 1, feature 2)).

A series of key values representing sequential inputs can be stored in the memory 816 and used by the classifier circuitry 806, such as to detect malicious (not necessarily anomalous) behavior. A malicious or other behavior of interest can be operated on by the processing circuitry 804 and the key values of the behavior can be recorded. The key values can be stored and associated with the malicious behavior. Key values subsequently generated by the processing circuitry 804 can be compared to the key values associated with the malicious behavior to detect the malicious behavior in the future.

Figure 11:
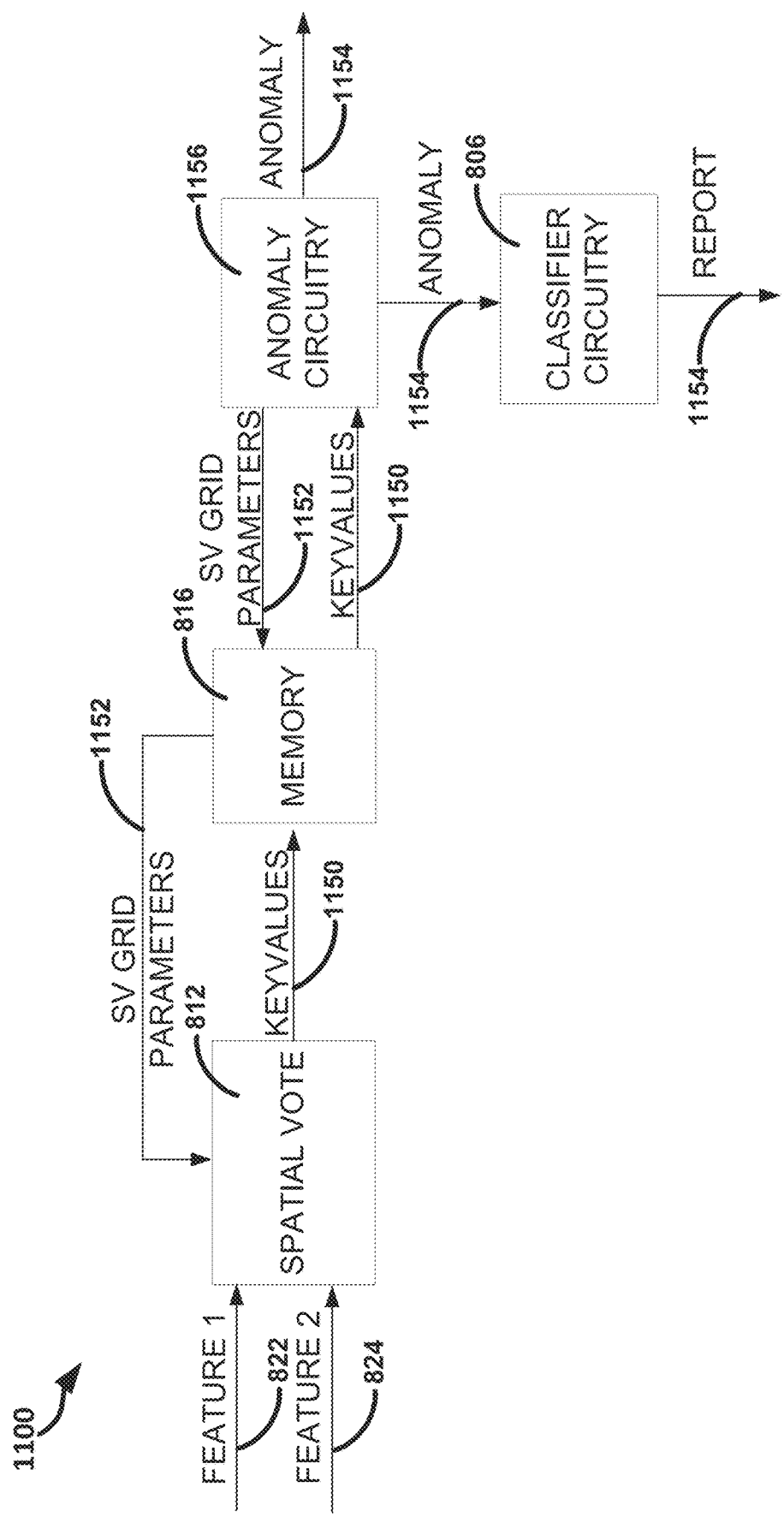
FIG. 11 illustrates, by way of example, a diagram of an embodiment of a system for anomaly detection.

FIG. 11 illustrates, by way of example, a diagram of an embodiment of a system 1100 for anomaly detection. The system 1100 includes an exploded view diagram of a portion of the system 800. The system 1100 as illustrated includes the operation 812 of the processing circuitry 804, the memory 816, the classifier circuitry 806, and anomaly circuitry 1156. The operation 812 determines key values 1150 based on SV grid parameters 1152 from the memory 816 and features 822, 824 determined by the processing circuitry 804. The anomaly circuitry 1156 can provide data indicating inputs mapped to a behavior never seen before (e.g., data mapped to a cell that was not populated previously).

The key values in the memory 816 can allow for F-testing, t-testing, or Z-score analysis, such as by the classifier circuitry 806. These analyses can help identify significant columns and cells. The classifier circuitry 806 can provide event and pre-event logs in a report 1154, such as for further analysis. The report 1154 can provide information on which column or cell corresponds to the most different behavior.

Figure 12:
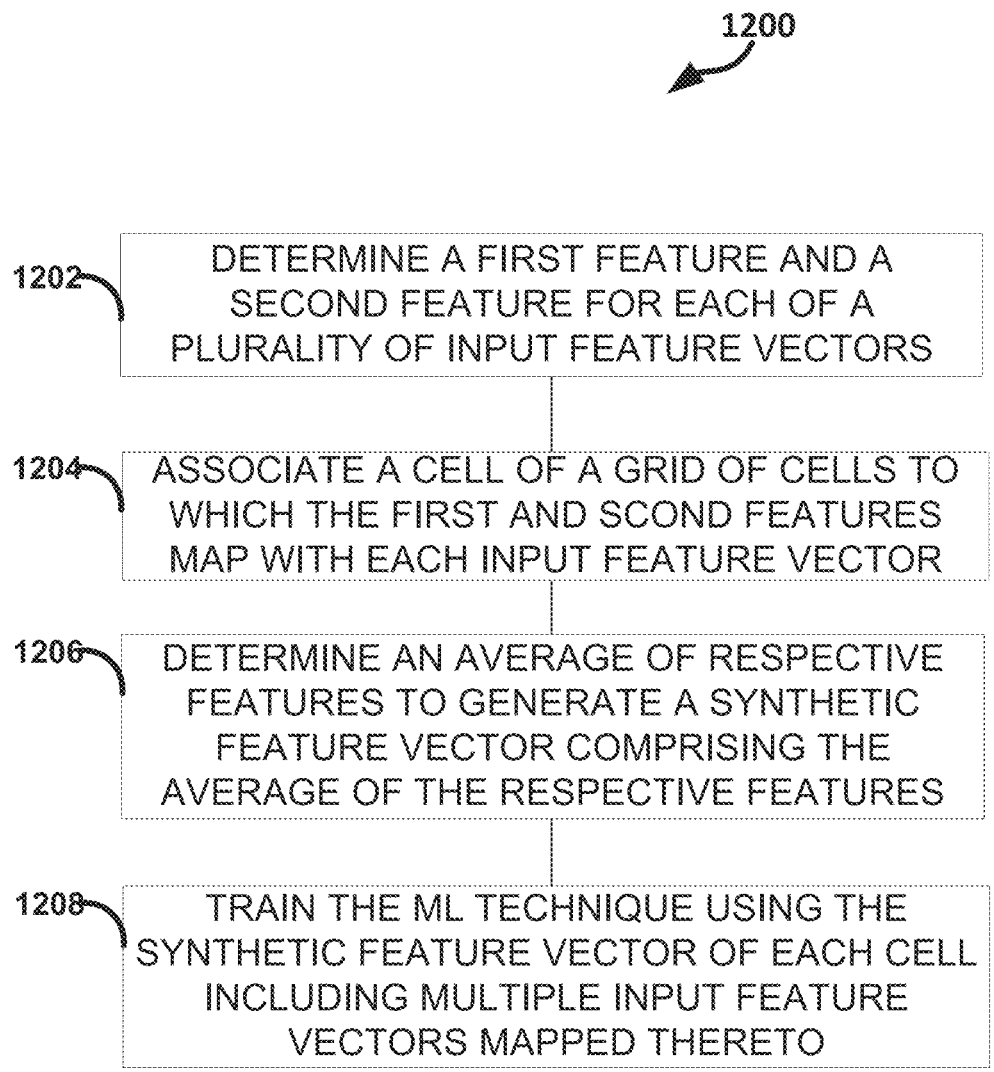
FIG. 12 illustrates, by way of example, a diagram of an embodiment of a method for generating and using synthetic data.

FIG. 12 illustrates, by way of example, a diagram of an embodiment of a method 1200 for generating and using synthetic data (e.g., for model training). The method 1200 as illustrated includes determining a first feature and a second feature for each of a plurality of input feature vectors, at operation 1202; associating a cell of the grid of cells to which the first and second features map with each input feature vector, at operation 1204; determining (e.g., for each cell that includes multiple input feature vectors associated therewith and based on features of the input feature vectors mapped thereto) an average of respective features to generate a synthetic feature vector comprising the average of the respective features, at operation 1206; and training the ML technique using the synthetic feature vector of each cell including multiple input feature vectors mapped thereto, at operation 1208.

The operation 1202 can include, given the same numbers in a different order, producing a different value for the respective feature of the first and second features. The method 1200 can further include, wherein each input feature vector includes an associated class and the processing circuitry is further configured to generate a sub-grid of sub-cells for each cell of the grid of cells that includes input feature vectors with different associated classes associated therewith.

The method 1200 can further include, wherein the sub-grid of sub-cells includes a number of cells greater than, or equal to, a number of input feature vectors mapped thereto. The method 1200 can further include, wherein the number rows and columns of sub-cells is odd and the sub-grid includes a number of rows and columns equal to a maximum of (a) three and (b) a square root of the number of input feature vectors mapped thereto. The method 1200 can further include, wherein the sub-grid includes a same center as the cell for which the sub-grid is generated. The method 1200 can further include, wherein the synthetic feature vector is determined based on only feature vectors associated with a same class.

Figure 13:
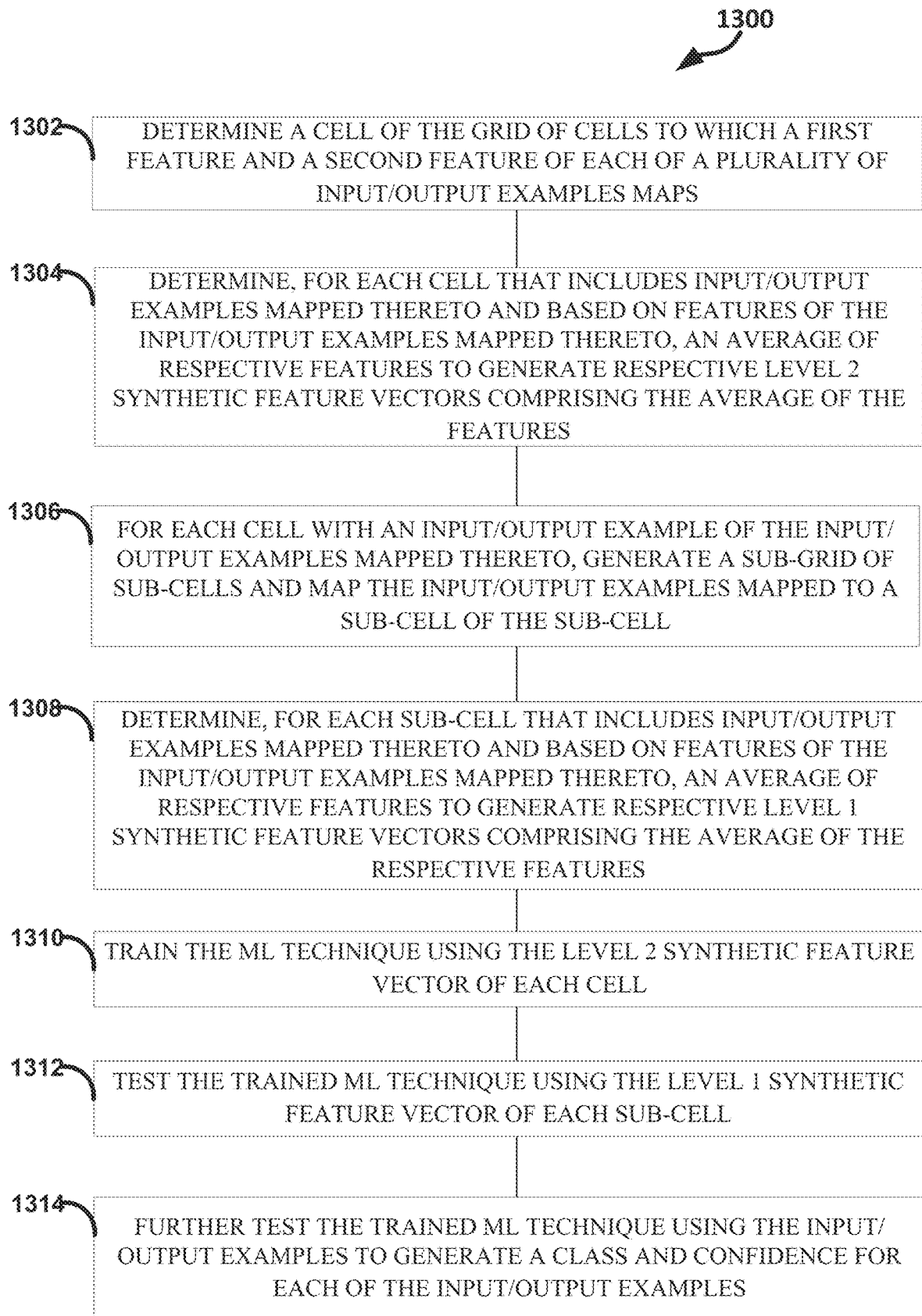
FIG. 13 illustrates, by way of example, a diagram of an embodiment of a method for improving an ML technique.

FIG. 13 illustrates, by way of example, a diagram of an embodiment of a method 1300 for improving an ML technique. The method 1300 as illustrated includes determining a cell of a grid of cells to which a first feature and a second feature of each of a plurality of input/output examples maps, at operation 1302; determining, for each cell that includes input/output examples mapped thereto and based on features of the input/output examples mapped thereto, an average of respective features to generate respective level 2 synthetic feature vectors comprising the average of the features, at operation 1304; for each cell with an input/output example of the input/output examples mapped thereto, generating a sub-grid of sub-cells and map the input/output examples mapped to a sub-cell of the sub-cell, at operation 1306; determining, for each sub-cell that includes input/output examples mapped thereto and based on features of the input/output examples mapped thereto, an average of respective features to generate respective level 1 synthetic feature vectors comprising the average of the respective features, at operation 1308; training the ML technique using the level 2 synthetic feature vector of each cell, at operation 1310; testing the trained ML technique using the level 1 synthetic feature vector of each sub-cell, at operation 1312; and further testing the trained ML technique using the input/output examples to generate a class and confidence for each of the input/output examples, at operation 1314.

The method 1300 can further include, wherein the operations further include generating a training accuracy based on training the ML technique using the level 2 synthetic feature vector of each cell, and a testing accuracy based on testing the ML technique using the level 1 synthetic feature vector of each sub-cell. The method 1300 can further include, wherein the operations further include training the ML technique using the class, the confidence, the testing accuracy, the training accuracy, and the training accuracy divided by the testing accuracy.

The method 1300 can further include training the ML technique using the class, the confidence, the testing accuracy, the training accuracy, and the training accuracy divided by the testing accuracy of an immediately previous trained technique until a specified testing accuracy is achieved. The method 1300 can further include, wherein training the ML technique using the level 2 synthetic feature vector of each cell includes training multiple, different ML techniques, a training accuracy is generated for each of the different ML techniques, and testing the trained ML technique using the level 1 synthetic feature vector of each sub-cell includes testing the trained ML techniques, and a testing accuracy is generated for each of the different ML techniques.

The method 1300 can further include, wherein the operations further include identifying an importance of a first criteria of the ML techniques relative to a second criteria of the ML techniques, and identifying, using an analytical hierarchical processing (AHP) technique, an ML technique of the ML techniques that best meets the first and second criteria. The method 1300 can further include, wherein the first and second criteria include different ones of an amount of memory consumed by the trained ML technique, a training time of the ML technique, and an accuracy in classification in a class of the classes.

Figure 14:
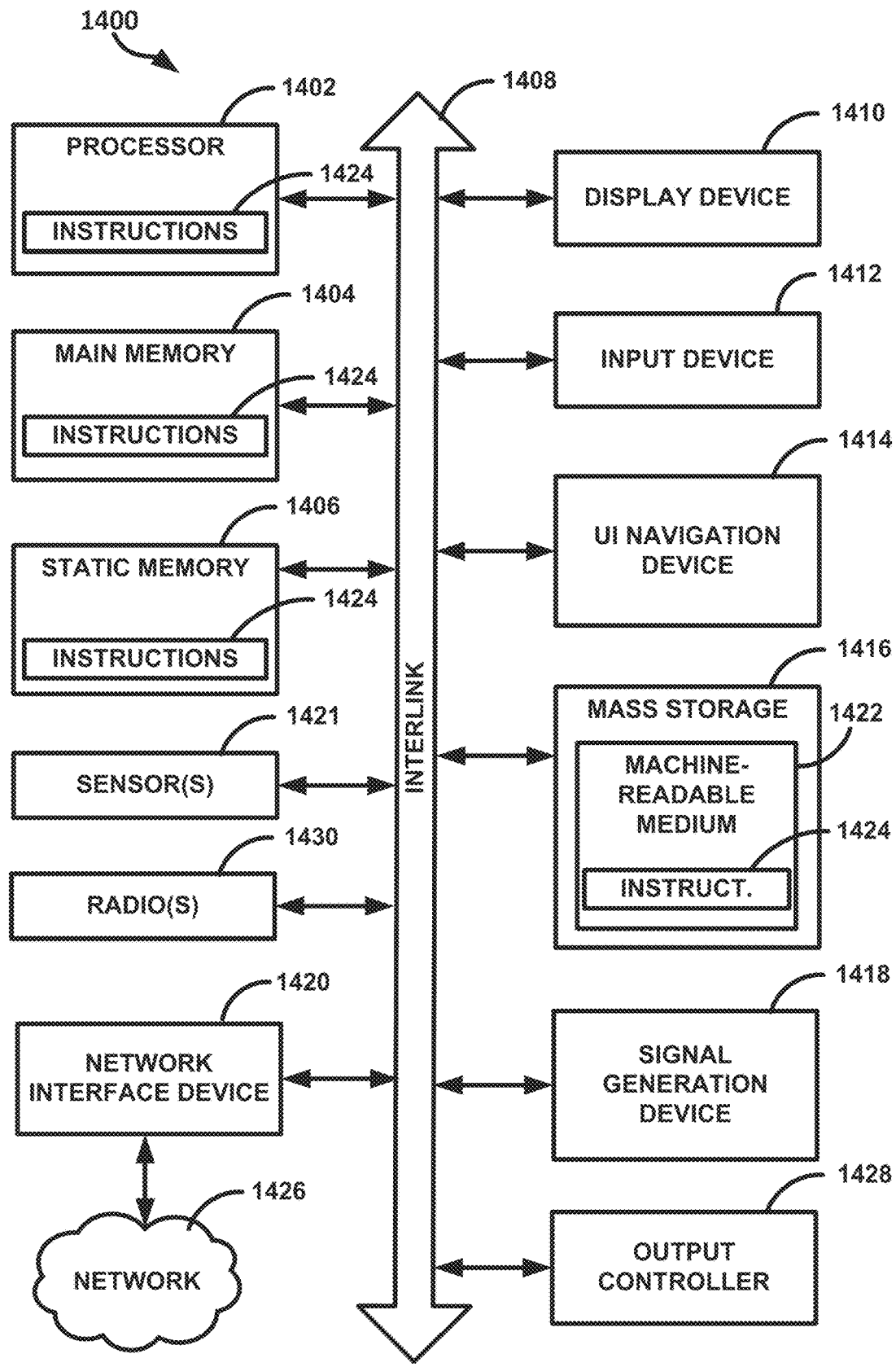
FIG. 14 illustrates, by way of example, a block diagram of an embodiment of a machine on which one or more of the methods, such as those discussed about FIGS. 1-13 and elsewhere herein can be implemented.

FIG. 14 illustrates, by way of example, a block diagram of an embodiment of a machine 1400 on which one or more of the methods, such as those discussed about FIGS. 1-13 and elsewhere herein can be implemented. In one or more embodiments, one or more items of the system 100, 300, 400, 500, 600, 800, 900, and 1100 can be implemented by the machine 1400. In alternative embodiments, the machine 1400 operates as a standalone device or may be connected (e.g., networked) to other machines. In a networked deployment, the machine 1400 may operate in the capacity of a server or a client machine in server-client network environment, or as a peer machine in a peer-to-peer (or distributed) network environment. The machine 1400 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 1400 includes processing circuitry 1402 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 1421 (e.g., a transducer that converts one form of energy (e.g., light, heat, electrical, mechanical, or other energy) to another form of energy), or the like, or a combination thereof), a main memory 1404 and a static memory 1406, which communicate with each other and all other elements of machine 1400 via a bus 1408. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 1400 (e.g., computer system) may further include a video display unit 1410 (e.g., a liquid crystal display (LCD) or a cathode ray tube (CRT)). The machine 1400 also includes an alphanumeric input device 1412 (e.g., a keyboard), a user interface (UI) navigation device 1414 (e.g., a mouse), a disk drive or mass storage unit 1416, a signal generation device 1418 (e.g., a speaker) and a network interface device 1420.

The mass storage unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processing circuitry 1402 during execution thereof by the machine 1400, the main memory 1404 and the processing circuitry 1402 also constituting machine-readable media. One or more of the main memory 1404, the mass storage unit 1416, or other memory device can store the data for executing a method discussed herein.

The machine 1400 as illustrated includes an output controller 1428. The output controller 1428 manages data flow to/from the machine 1400. The output controller 1428 is sometimes called a device controller, with software that directly interacts with the output controller 1428 being called a device driver.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1424 may further be transmitted or received over a communications network 1426 using a transmission medium. The instructions 1424 may be transmitted using the network interface device 1420 and any one of several well-known transfer protocols (e.g., hypertext transfer protocol (HTTP), user datagram protocol (UDP), transmission control protocol (TCP)/internet protocol (IP)). The network 1426 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

This disclosure can be understood with a description of some embodiments, sometimes called examples.

Example 1 can include a system for reducing machine learning (ML) technique training time and memory overhead, the system comprising a memory including data indicating a grid size and a number of cells in a grid of cells, processing circuitry coupled to the memory, the processing circuitry being configured to determine a first feature and a second feature for each of a plurality of input feature vectors, associate a cell of the grid of cells to which the first and second features map with each input feature vector, determine, for each cell that includes multiple input feature vectors associated therewith and based on features of the input feature vectors mapped thereto, an average of respective features to generate a synthetic feature vector comprising the average of the respective features, and train the ML technique using the synthetic feature vector of each cell including multiple input feature vectors mapped thereto.

In Example 2, Example 1 can further include, wherein determining the first feature and the second feature includes, given the same numbers in a different order, producing a different value for the respective feature.

In Example 3, at least one of Examples 1-2 can further include, wherein each input feature vector includes an associated class and the processing circuitry is further configured to generate a sub-grid of sub-cells for each cell of the grid of cells that includes input feature vectors with different associated classes associated therewith.

In Example 4, Example 3 can further include, wherein the sub-grid of sub-cells includes a number of cells greater than, or equal to, a number of input feature vectors mapped thereto.

In Example 5, Example 4 can further include, wherein the number rows and columns of sub-cells is odd and the sub-grid includes a number of rows and columns equal to a maximum of (a) three and (b) a square root of the number of input feature vectors mapped thereto.

In Example 6, Example 5 can further include, wherein the sub-grid includes a same center as the cell for which the sub-grid is generated.

In Example 7, at least one of Examples 3-6 can further include, wherein the synthetic feature vector is determined based on only feature vectors associated with a same class.

Example 8 can include a method of performing the operations of the processing circuitry of at least one of Examples 1-7.

Example 9 can include a non-transitory machine-readable medium including instructions that, when executed by a machine, cause the machine to perform operations of the processing circuitry of at least one of Examples 1-7.

Example 10 includes a system for improving machine learning (ML) technique classification accuracy, the system comprising a memory including data indicating a grid size and a number of cells in a grid of cells, processing circuitry coupled to the memory, the processing circuitry being configured to determine a cell of the grid of cells to which a first feature and a second feature of each of a plurality of input/output examples maps, determine, for each cell that includes input/output examples mapped thereto and based on features of the input/output examples mapped thereto, an average of respective features to generate respective level 2 synthetic feature vectors comprising the average of the features, for each cell with an input/output example of the input/output examples mapped thereto, generate a sub-grid of sub-cells and map the input/output examples mapped to a sub-cell of the sub-cell, determine, for each sub-cell that includes input/output examples mapped thereto and based on features of the input/output examples mapped thereto, an average of respective features to generate respective level 1 synthetic feature vectors comprising the average of the respective features, train the ML technique using the level 2 synthetic feature vector of each cell, test the trained ML technique using the level 1 synthetic feature vector of each sub-cell, and further test the trained ML technique using the input/output examples to generate a class and confidence for each of the input/output examples.

In Example 11, Example 10 can further include, wherein the processing circuitry is further to generate a training accuracy based on training the ML technique using the level 2 synthetic feature vector of each cell, and a testing accuracy based on testing the ML technique using the level 1 synthetic feature vector of each sub-cell.

In Example 12, Example 11 can further include, wherein the processing circuitry is further to train the ML technique using the class, the confidence, the testing accuracy, the training accuracy, and the training accuracy divided by the testing accuracy.

In Example 13, Example 12 can further include, wherein the processing circuitry is further to train the ML technique using the class, the confidence, the testing accuracy, the training accuracy, and the training accuracy divided by the testing accuracy of an immediately previous trained technique until a specified testing accuracy is achieved.

In Example 14, at least one of Examples 10-13 can further include, wherein training the ML technique using the level 2 synthetic feature vector of each cell includes training multiple, different ML techniques, a training accuracy is generated for each of the different ML techniques, and testing the trained ML technique using the level 1 synthetic feature vector of each sub-cell includes testing the trained ML techniques, and a testing accuracy is generated for each of the different ML techniques.

In Example 15, Example 14 can further include, wherein the processing circuitry is further configured to identify an importance of a first criteria of the ML techniques relative to a second criteria of the ML techniques, and identify, using an analytical hierarchical processing (AHP) technique, an ML technique of the ML techniques that best meets the first and second criteria.

In Example 16, Example 15 can further include, wherein the first and second criteria include different ones of an amount of memory consumed by the trained ML technique, a training time of the ML technique, and an accuracy in classification in a class of the classes.

Example 17 includes a method of performing the operations of the processing circuitry of at least one of Examples 10-16.

Example 18 includes a non-transitory machine-readable medium including instructions that, when executed by a machine, cause the machine to perform operations of the processing circuitry of at least one of Example 10-16. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for improving machine learning (Mt) technique classification accuracy, the system comprising:
    a memory including data indicating a grid size and a number of cells in a grid of cells;
    processing circuitry coupled to the memory, the processing circuitry:
    determines a cell of the grid of cells to which a first feature and a second feature of each of a plurality of input/output examples maps;
    determines, for each cell that includes input/output examples mapped thereto and based on features of the input/output examples mapped thereto, an average of respective features to generate respective level 2 synthetic feature vectors comprising the average of the features, the average including mean, expectation, median, or mode;
    for each cell with an input/output example of the input/output examples mapped thereto, generates a sub-grid of sub-cells and map the input/output examples mapped to the cell to a sub-cell of the sub-cells;
    determines, for each sub-cell that includes input/output examples mapped thereto and based on features of the input/output examples mapped thereto, an average of respective features to generate respective level 1 synthetic feature vectors comprising the average of the respective features;
    train the ML technique using the level 2 synthetic feature vector of each cell;
    tests the trained ML technique using the level 1 synthetic feature vector of each sub-cell; and
    further tests the trained ML technique using the input/output examples to generate a class and confidence for each of the input/output examples.

2. The system of claim 1, wherein the processing circuitry further generates a training accuracy based on training the Mt technique using the level 2 synthetic feature vector of each cell, and a testing accuracy based on testing the ML technique using the level 1 synthetic feature vector of each sub-cell.

3. The system of claim 2, wherein the processing circuitry further trains the ML technique using the class, the confidence, the testing accuracy, the training accuracy, and the training accuracy divided by the testing accuracy.

4. The system of claim 3, wherein the processing circuitry further trains the ML technique using the class, the confidence, the testing accuracy, the training accuracy, and the training accuracy divided by the testing accuracy of an immediately previous trained technique until a specified testing accuracy is achieved.

5. The system of claim 1, wherein training the ML technique using the level 2 synthetic feature vector of each cell includes training multiple, different ML techniques, a training accuracy is generated for each of the different ML techniques, and testing the trained ML technique using the level 1 synthetic feature vector of each sub-cell includes testing the trained ML techniques, and a testing accuracy is generated for each of the different ML techniques.

6. The system of claim 5, wherein the processing circuitry further configured to identifies an importance of a first criteria of the ML techniques relative to a second criteria of the ML techniques, and identify, using an analytical hierarchical processing (AHP) technique, an ML technique of the ML techniques that best meets the first and second criteria.

7. The system of claim 6, wherein the first and second criteria include different ones of an amount of memory consumed by the trained ML technique, a training time of the ML technique, and an accuracy in classification in a class of the classes.

8. A non-transitory machine-readable medium including instructions that, when executed by a machine, cause the machine to perform operations for improving machine learning (ML) technique classification accuracy, the operations comprising:
    determining a cell of a grid of cells to which a first feature and a second feature of each of a plurality of input/output examples maps;
    determining, for each cell that includes input/output examples mapped thereto and based on features of the input/output examples mapped thereto, an average of respective features to generate respective level 2 synthetic feature vectors comprising the average of the features, the average including mean, expectation, median, or mode;
    for each cell with an input/output example of the input/output examples mapped thereto, generate a sub-grid of sub-cells and map the input/output examples mapped to the cell to a sub-cell of the sub-cells;
    determining, for each sub-cell that includes input/output examples mapped thereto and based on features of the input/output examples mapped thereto, an average of respective features to generate respective level 1 synthetic feature vectors comprising the average of the respective features;
    training the ML technique using the level 2 synthetic feature vector of each cell;
    testing the trained ML technique using the level 1 synthetic feature vector of each sub-cell; and
    further testing the trained ML technique using the input/output examples to generate a class and confidence for each of the input/output examples.

9. The non-transitory machine-readable medium of claim 8, wherein the operations further include generating a training accuracy based on training the ML technique using the level 2 synthetic feature vector of each cell, and a testing accuracy based on testing the ML technique using the level 1 synthetic feature vector of each sub-cell.

10. The non-transitory machine-readable medium of claim 9, wherein the operations further include training the ML technique using the class, the confidence, the testing accuracy, the training accuracy, and the training accuracy divided by the testing accuracy.

11. The non-transitory machine-readable medium of claim 10, further comprising training the ML technique using the class, the confidence, the testing accuracy, the training accuracy, and the training accuracy divided by the testing accuracy of an immediately previous trained technique until a specified testing accuracy is achieved.

12. The non-transitory machine-readable medium of claim 11, wherein training the technique using the level 2 synthetic feature vector of each cell includes training multiple, different Mt techniques, a training accuracy is generated for each of the different ML techniques, and testing the trained ML technique using the level 1 synthetic feature vector of each sub-cell includes testing the trained ML techniques, and a testing accuracy is generated for each of the different ML techniques.

13. The non-transitory machine-readable medium of claim 12, wherein the operations further include identifying an importance of a first criteria of the MI, techniques relative to a second criteria of the ML techniques, and identifying, using an analytical hierarchical processing (AHP) technique, an ML technique of the ML techniques that best meets the first and second criteria.

14. The non-transitory machine-readable medium of claim 13, wherein the first and second criteria include different ones of an amount of memory consumed by the trained ML technique, a training time of the ML technique, and an accuracy in classification in a class of the classes.

15. A method for improving machine learning (MTI) technique classification accuracy, the method comprising:
    determining a cell of a grid of cells to which a first feature and a second feature of each of a plurality of input/output examples maps;
    determining, for each cell that includes input/output examples mapped thereto and based on features of the input/output examples mapped thereto, an average of respective features to generate respective level 2 synthetic feature vectors comprising the average of the features, the average including mean, expectation, median, or mode;
    for each cell with an input/output example of the input/output examples mapped thereto, generate a sub-grid of sub-cells and map the input/output examples mapped to the cell to a sub-cell of the sub-cells:
    determining, for each sub-cell that includes input/output examples mapped thereto and based on features of the input/output examples mapped thereto, an average of respective features to generate respective level 1 synthetic feature vectors comprising the average of the respective features;
    training the ML technique using the level 2 synthetic feature vector of each cell;
    testing the trained ML technique using the level 1 synthetic feature vector of each sub-cell; and
    further testing the trained NIL technique using the input/output examples to generate a class and confidence for each of the input/output examples.

16. The method of claim 15, further comprising generating a training accuracy based on training the ML technique using the level 2 synthetic feature vector of each cell, and a testing accuracy based on testing the ML technique using the level 1 synthetic feature vector of each sub-cell.

17. The method of claim 16, further comprising training the ML technique using the class, the confidence, the testing accuracy, the training accuracy, and the training accuracy divided by the testing accuracy.

18. The method of claim 17, further comprising training the MI technique using the class, the confidence, the testing accuracy, the training accuracy, and the training accuracy divided by the testing accuracy of an immediately previous trained technique until a specified testing accuracy is achieved.

19. The method of claim 18, wherein training the ML technique using the level 2 synthetic feature vector of each cell includes training multiple, different ML techniques, a training accuracy is generated for each of the different MI, techniques, and testing the trained ML technique using the level 1 synthetic feature vector of each sub-cell includes testing the trained ML techniques, and a testing accuracy is generated for each of the different ML techniques.

20. The method of claim 19, further comprising identifying an importance of a first criteria of the ML techniques relative to a second criteria of the ML techniques, and identifying, using an analytical hierarchical processing (AHP) technique, an Mt technique of the ML techniques that best meets the first and second criteria.

* * * * *